US012803413B2

(12) United States Patent
Zhong

(10) Patent No.: US 12,803,413 B2

(45) Date of Patent: Nov. 17, 2026

(54) POWER CONSUMPTION DETECTION CIRCUIT, POWER CONSUMPTION DETECTION CHIP, AND TERMINAL DEVICE

(71) Applicant: HONOR DEVICE CO., LTD., Shenzhen (CN)

(72) Inventor: Guanghua Zhong, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 361 days.

(21) Appl. No.: 18/706,911

(22) PCT Filed: Nov. 28, 2023

(86) PCT No.: PCT/CN2023/134803

§ 371 (c)(1),
(2) Date: May 2, 2024

(87) PCT Pub. No.: WO2024/198444

PCT Pub. Date: Oct. 3, 2024

(65) Prior Publication Data

US 2026/0163464 A1 Jun. 11, 2026

(30) Foreign Application Priority Data

Mar. 29, 2023 (CN) ......................... 202310321092.2

(51) Int. Cl.
*G01R 21/00* (2006.01)
*H02M 1/00* (2006.01)

(52) U.S. Cl.
CPC ................................. *H02M 1/0067* (2021.05)

(58) Field of Classification Search
CPC ............... H02M 1/0067; G01R 15/146; G01R 19/16542; G01R 21/133; G01R 21/00; G06F 1/28; G06F 1/3203; Y02D 10/00
See application file for complete search history.

(56) References Cited

U.S. PATENT DOCUMENTS 6,815,935 B2 11/2004 Fujii
2014/0183952 A1 7/2014 Liu
(Continued)

FOREIGN PATENT DOCUMENTS

CN 101286855 A 10/2008
CN 101413965 A 4/2009
(Continued)

OTHER PUBLICATIONS

Zhu Li, "A dynamic measurement and analysis system for multi-channel power", Thesis for the degree of Master, Nanjing University of Information Science and Technology, Jun. 1, 2014, 126 pages (with English Translation).

*Primary Examiner* — Elim Ortiz
(74) *Attorney, Agent, or Firm* — Fish & Richardson P.C.

(57) ABSTRACT

This application discloses a power consumption detection circuit, a power consumption detection chip, and a terminal device, and relates to the field of circuit technologies. The power consumption detection circuit includes a plurality of current channels and a processing module. When the power consumption detection circuit is applied to the terminal device, input terminals of the plurality of current channels are configured to connect to an energy storage module, and an output terminal of each current channel is configured to connect to a corresponding load module. A detection terminal of the processing module is connected to each current channel, to detect a current value of each current channel, thereby determining power consumption of a corresponding load module based on the current value of each current channel.

17 Claims, 18 Drawing Sheets

(56) References Cited

U.S. PATENT DOCUMENTS

| | | | |
|---|---|---|---|
| 2014/0354266 | A1 | 12/2014 | Hurwitz et al. |
| 2019/0140438 | A1 | 5/2019 | Schiemann et al. |
| 2019/0369167 | A1 | 12/2019 | Bhat et al. |
| 2021/0173419 | A1 | 6/2021 | Severson et al. |

FOREIGN PATENT DOCUMENTS

| | | | | | |
|---|---|---|---|---|---|
| CN | 101413966 | A | | 4/2009 | |
| CN | 101435834 | A | | 5/2009 | |
| CN | 101650408 | A | | 2/2010 | |
| CN | 101672872 | A | | 3/2010 | |
| CN | 102246049 | A | | 11/2011 | |
| CN | 102590609 | A | | 7/2012 | |
| CN | 103323712 | A | | 9/2013 | |
| CN | 103777067 | A | | 5/2014 | |
| CN | 104101777 | A | | 10/2014 | |
| CN | 104182337 | A | | 12/2014 | |
| CN | 104598364 | A | * | 5/2015 | |
| CN | 105445540 | A | | 3/2016 | |
| CN | 105629052 | A | | 6/2016 | |
| CN | 205450105 | U | | 8/2016 | |
| CN | 106802845 | A | * | 6/2017 | .......... G06F 11/2268 |
| CN | 107478996 | A | | 12/2017 | |
| CN | 107884619 | A | | 4/2018 | |
| CN | 107942133 | A | | 4/2018 | |
| CN | 108362937 | A | | 8/2018 | |
| CN | 108761187 | A | | 11/2018 | |
| CN | 110515022 | A | | 11/2019 | |
| CN | 110907807 | A | | 3/2020 | |
| CN | 210626561 | U | | 5/2020 | |
| CN | 210865578 | U | | 6/2020 | |
| CN | 111638441 | A | | 9/2020 | |
| CN | 111669202 | A | | 9/2020 | |
| CN | 211786009 | U | | 10/2020 | |
| CN | 212905201 | U | | 4/2021 | |
| CN | 113300474 | A | | 8/2021 | |
| CN | 114019884 | A | | 2/2022 | |
| CN | 215833495 | U | | 2/2022 | |
| CN | 115112944 | A | | 9/2022 | |
| CN | 115561514 | A | | 1/2023 | |
| CN | 115754459 | A | | 3/2023 | |
| CN | 116027103 | A | | 4/2023 | |
| JP | S5587052 | A | | 7/1980 | |
| JP | 2003222645 | A | | 8/2003 | |
| JP | 2004085413 | A | | 3/2004 | |
| JP | 2020046225 | A | | 3/2020 | |
| JP | 7016658 | B2 | | 2/2022 | |
| WO | 0227905 | A1 | | 4/2002 | |
| WO | 2013093554 | A1 | | 6/2013 | |

* cited by examiner

POWER CONSUMPTION DETECTION CIRCUIT, POWER CONSUMPTION DETECTION CHIP, AND TERMINAL DEVICE

CROSS-REFERENCE TO RELATED APPLICATIONS

This application is a national stage of International Application No. PCT/CN2023/134803, filed on Nov. 28, 2023, which claims priority to Chinese Patent Application No. 202310321092.2, filed on Mar. 29, 2023. The disclosures of the aforementioned applications are hereby incorporated by reference in their entireties

TECHNICAL FIELD

This application relates to the field of circuit technologies, and in particular, to a power consumption detection circuit, a power consumption detection chip, and a terminal device.

BACKGROUND

Terminal devices include a mobile phone, a tablet computer, a notebook computer, and the like. The terminal device usually includes a plurality of load modules, and each load module includes a voltage conversion unit and a load unit that are connected in series. The load unit may be, for example, a central processing unit, a graphics processing unit, a baseband processor, a loudspeaker, a display, or the like. With development of science and technology, functions of the terminal device are increasingly abundant, and application scenarios of the terminal device are increasing. Therefore, to improve standby experience of the terminal device, a power consumption detection circuit is urgently needed to detect a standby capability of the terminal device in real time.

SUMMARY

This application provides a power consumption detection circuit, a power consumption detection chip, and a terminal device. When the power consumption detection circuit is applied to the terminal device, power consumption of each load module in the terminal device may be detected, so that a standby capability of the terminal device can be detected in real time. The technical solutions are as follows:

According to a first aspect, a power consumption detection circuit is provided. The power consumption detection circuit is applied to a terminal device. The terminal device includes an energy storage module and a plurality of load modules. Each load module includes a voltage conversion unit and a load unit that are connected in series. In each load module, the voltage conversion unit is connected between the energy storage module and the load unit, so that electrical energy output by the energy storage module to the load module is output to the load unit through the voltage conversion unit.

The power consumption detection circuit includes a plurality of current channels and a processing module. A quantity of current channels is equal to a quantity of load modules in the terminal device, and the plurality of current channels are in a one-to-one correspondence with the plurality of load modules. Input terminals of the plurality of current channels are configured to connect to the energy storage module, and an output terminal of each of the plurality of current channels is configured to connect to an input terminal of a corresponding load module. That is, the energy storage module supplies power to the corresponding load module through the current channel.

A detection terminal of the processing module is connected to each current channel. The processing module is configured to detect a current value of each of the plurality of current channels, and determine power consumption of the corresponding load module based on the current value of each current channel. In this way, the power consumption detection circuit can detect power consumption of each load module in the terminal device when being applied to the terminal device. Based on this, a standby capability of the terminal device can be detected in real time. In addition, when the power consumption detection circuit is applied to the terminal device, the power consumption of each load module, that is, total power consumption of the voltage conversion unit and the load unit, is detected. When the load unit operates, the voltage conversion unit connected to the load unit also needs to operate. Therefore, compared with detecting only power consumption of the load unit, more realistic and accurate power consumption data can be obtained by detecting the total power consumption of the voltage conversion unit and the load unit, thereby more precisely detecting the standby capability of the terminal device. The processing module is integrated in the power consumption detection circuit, so that the power consumption detection circuit operates without relying on a system on chip in the terminal device. In this way, when the terminal device is in a power-off state, the power consumption detection circuit may also run independently.

In some embodiments, the processing module is configured to: detect the current value of each current channel if a third instruction is received, and determine the power consumption of the corresponding load module based on the current value of each current channel; or stop detecting the current value of each current channel if a fourth instruction is received. The third instruction is used to instruct the processing module to start detecting the power consumption of the load module corresponding to each current channel. The fourth instruction is used to instruct the processing module to stop detecting the power consumption of the load module corresponding to each current channel. That is, in this embodiment, the processing module detects the current value of each current channel only after receiving the third instruction, and determines the power consumption of the corresponding load module based on the current value of each current channel. The processing module stops detecting the current value of each current channel after receiving the fourth instruction. In this case, the processing module no longer detects the power consumption of the load module corresponding to each current channel.

In some embodiments, a load module corresponding to any one of the plurality of current channels includes one voltage conversion unit and a plurality of load units. An output terminal of the current channel is configured to connect to an input terminal of the voltage conversion unit, and an output terminal of the voltage conversion unit is connected to the plurality of load units. The processing module is further configured to: when the plurality of load units operate simultaneously, determine power consumption of one of the plurality of load units based on a current value of the current channel and a preset ratio. The preset ratio is a ratio of the power consumption of the load unit to power consumption of the load module corresponding to the current channel when the plurality of load units operate simultaneously. In this way, one load module may include a plurality of load units, and the quantity of current channels can be reduced, to achieve an objective of saving costs.

The following describes a specific structure and an operation process of the power consumption detection circuit in two possible implementations.

In a first possible implementation, any one of the plurality of current channels includes a sampling resistor. A first terminal of the sampling resistor is configured to connect to the energy storage module, and a second terminal of the sampling resistor is configured to connect to an input terminal of a load module corresponding to the current channel.

In this embodiment, the processing module includes a current sensing unit and a processing unit. A detection terminal of the current sensing unit is connected to the sampling resistor, and an output terminal of the current sensing unit is connected to an input terminal of the processing unit. The current sensing unit is configured to detect a voltage value of the sampling resistor, determine a current value of the current channel based on the voltage value of the sampling resistor, and send the current value of the current channel to the processing unit. The processing unit is configured to determine power consumption of the corresponding load module based on the current value of the current channel.

In some embodiments, the power consumption of the load module may be at least one of a current value of the load module, a power of the load module, and electrical energy used by the load module within preset duration.

When the power consumption of the load module is the current value of the load module, as described above, the output terminal of each current channel is connected to the input terminal of the corresponding load module. That is, the current value of each current channel is a current value of the corresponding load module. Therefore, the current value of any current channel is the power consumption of the corresponding load module.

When the power consumption of the load module is the power of the load module or the electrical energy used by the load module within the preset duration, the processing unit is further configured to detect an input voltage value of the current channel, and determine the power consumption of the corresponding load module based on the current value and the input voltage value of the current channel.

Specifically, w % ben the power consumption of the load module is the power of the load module, the processing unit may include a multiplier. A first input terminal of the multiplier is configured to input the current value of the current channel, and a second input terminal of the multiplier is configured to input the input voltage value of the current channel. The multiplier is configured to multiply the current value of the current channel by the input voltage value to obtain the power of the corresponding load module, that is, obtain the power consumption of the corresponding load module.

When the power consumption of the load module is the electrical energy used by the load module within the preset duration, the processing unit may include a multiplier and an integrator. A first input terminal of the multiplier is configured to input the current value of the current channel, a second input terminal of the multiplier is configured to input the input voltage value of the current channel, and an output terminal of the multiplier is connected to an input terminal of the integrator. The multiplier is configured to multiply the current value of the current channel by the input voltage value to obtain the power of the corresponding load module, and the integrator is configured to integrate the power of the load module to obtain the electrical energy used by the load module within the preset duration, that is, obtain the power consumption of the load module.

In a second possible implementation, any one of the plurality of current channels includes a first shunt unit. A first terminal of the first shunt unit is configured to connect to the energy storage module, and a second terminal of the first shunt unit is configured to connect to an input terminal of a load module corresponding to the current channel.

In this embodiment, the processing module includes a second shunt unit, a voltage regulation unit, a sampling resistor, a current sensing unit, and a processing unit. A first terminal of the second shunt unit is connected to the first terminal of the first shunt unit. A first terminal of the voltage regulation unit is connected to the second terminal of the first shunt unit, and a second terminal of the voltage regulation unit is connected to a second terminal of the second shunt unit. Voltage values of the first terminal and the second terminal of the voltage regulation unit are the same when the processing module operates. A first terminal of the sampling resistor is connected to the second terminal of the second shunt unit, and a second terminal of the sampling resistor is configured to connect to a ground cable. A detection terminal of the current sensing unit is connected to the sampling resistor, and an output terminal of the current sensing unit is connected to an input terminal of the processing unit.

The current sensing unit is configured to detect a voltage value of the sampling resistor, determine a current value of the sampling resistor based on the voltage value of the sampling resistor, determine a current value of the current channel based on the current value of the sampling resistor and a target ratio, and send the current value of the current channel to the processing unit. The processing unit is configured to determine power consumption of the corresponding load module based on the current value of the current channel.

The target ratio is a ratio of a current value of the first shunt unit to a current value of the second shunt unit. When "determining a current value of the current channel based on the current value of the sampling resistor and a target ratio", the processing unit may multiply the current value of the sampling resistor by the target ratio to obtain the current value of the current channel.

In some embodiments, any current channel further includes a switching component. The switching component is connected in series to another component in the current channel. To be specific, when any current channel includes a sampling resistor and a switching component, the sampling resistor and the switching component in the current channel are connected in series. When any current channel includes a first shunt unit and a switching component, the first shunt unit and the switching component in the current channel are connected in series.

A control terminal of the switching component is connected to an output terminal of the processing module. The processing module is further configured to: control the switching component to be turned on if a first instruction is received; and control the switching component to be turned off if a second instruction is received. The first instruction is used to instruct the terminal device to be powered on or instruct the load module corresponding to the current channel to operate. The second instruction is used to instruct the terminal device to be powered off or instruct the load module corresponding to the current channel to stop operating.

In some embodiments, the power consumption detection circuit further includes a power supply channel. An input terminal of the power supply channel is configured to connect to the energy storage module, and an output terminal of the power supply channel is connected to a power supply terminal of the processing module. That is, the energy storage module separately supplies power to the processing module in the power consumption detection circuit, and power consumption of the power consumption detection circuit is not included in the power consumption of the load module that is detected by the processing module. In this way, more realistic and accurate power consumption data of the load modules during operation of the terminal device can be obtained, thereby more precisely detecting the standby capability of the terminal device.

According to a second aspect, a power consumption detection chip is provided, and includes the power consumption detection circuit in any item of the first aspect. The power consumption detection chip may be a chip that encapsulates the power consumption detection circuit in any item of the first aspect.

According to a third aspect, a terminal device is provided, and includes an energy storage module, a plurality of load modules, and the power consumption detection circuit in any item of the first aspect or the power consumption detection chip in the second aspect.

In some embodiments, a load unit of any one of the plurality of load modules includes one of a central processing unit, a graphics processing unit, a baseband processor, a loudspeaker, and a display. Voltage conversion units in the plurality of load modules constitute a power management module.

Technical effects obtained in the second aspect and the third aspect are similar to the technical effects obtained through the corresponding technical means in the first aspect. Details are not described herein again.

Figure 1:
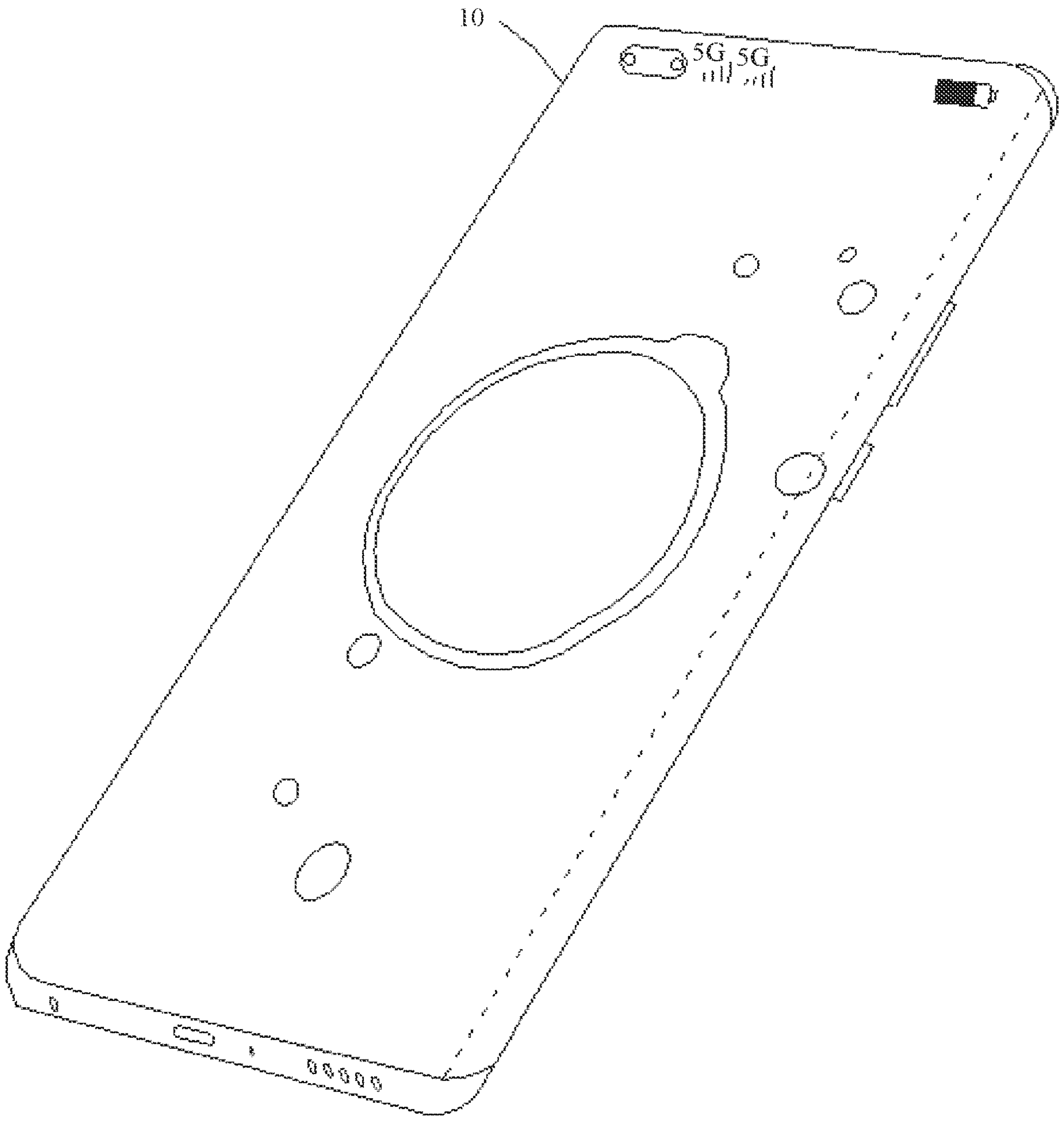
FIG. 1 is a schematic diagram of an appearance of an electronic device according to an embodiment of this application.

Meanings represented by reference numerals in the accompanying drawings are respectively as follows:

In this application:

10—terminal device; 110—display; 120—rear cover; 130—middle bezel; 131—metal plate; 132—top bezel; 133—bottom bezel; 134—left bezel; 135—right bezel; 140—circuit board; 150—energy storage module; 162—front-facing camera; 164—rear-facing camera; 30—power consumption detection circuit; 310—processing module; 312—processing unit; 3122—multiplier; 3124—integrator; 3126—analog-to-digital converter; 314—current sensing unit; 316—control unit; 317—second shunt unit; 319—voltage regulation unit; 320—power supply channel; 332—first shunt unit; 40—load module; 410—first load module; 420—second load module; 430—third load module; 440—fourth load module; and 450—ith load module.

In the related technology:

20—terminal device; 210—energy storage module; 220—load module; 222—first load module; 224—second load module; 226—third load module; and 228—Nth load module.

DESCRIPTION OF EMBODIMENTS

The following describes technical solutions in embodiments of this application with reference to the accompanying drawings in embodiments of this application. In the descriptions of embodiments of this application, unless otherwise specified, "/" represents "or". For example, A/B may represent A or B. In this specification, "and/or" is merely an association relationship for describing associated objects, and represents that three relationships may exist. For example, A and/or B may represent the following three cases: Only A exists, both A and B exist, and only B exists. In addition, in the descriptions of embodiments of this application, "a plurality of" refers to two or more.

To clearly describe technical solutions of this application, words such as "first" and "second" are used to distinguish between same items or similar items with basically the same functions and effects. Persons skilled in the art may understand that the words such as "first" and "second" do not limit a quantity and an execution sequence, and the words such as "first" and "second" do not indicate a definite difference.

Referring to "one embodiment", "some embodiments", or the like that is described in this specification of this application means that specific features, structures, or characteristics described with reference to one or more embodiments are included in the one or more embodiments of this application. Therefore, statements such as "in one embodiment", "in some embodiments", and "in some other embodiments" that appear in different parts of this specification of this application do not necessarily refer to same embodiments, but mean "one or more but not all embodiments" unless otherwise specifically emphasized in another manner. The terms "include", "comprise", "have", and variants thereof all mean "include but are not limited to", unless otherwise specifically emphasized in another manner.

Before a power consumption detection circuit provided in embodiments of this application is described in detail, an application scenario of the power consumption detection circuit is first described.

The power consumption detection circuit is applied to a terminal device. The terminal device herein may be, for example, a mobile phone, a tablet computer, a wearable device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant. PDA). A specific type of the terminal device is not limited in embodiments of this application.

The terminal device in embodiments of this application may also be referred to as an electronic device, user equipment (user equipment, UE), a mobile station (mobile station, MS), a mobile terminal (mobile terminal, MT), a mobile smart terminal device, an access terminal, a subscriber unit, a subscriber station, a mobile station, a mobile console, a remote station, a remote terminal, a mobile device, a user terminal, a terminal, a wireless communication device, a user agent, a user apparatus, or the like.

Figure 2:
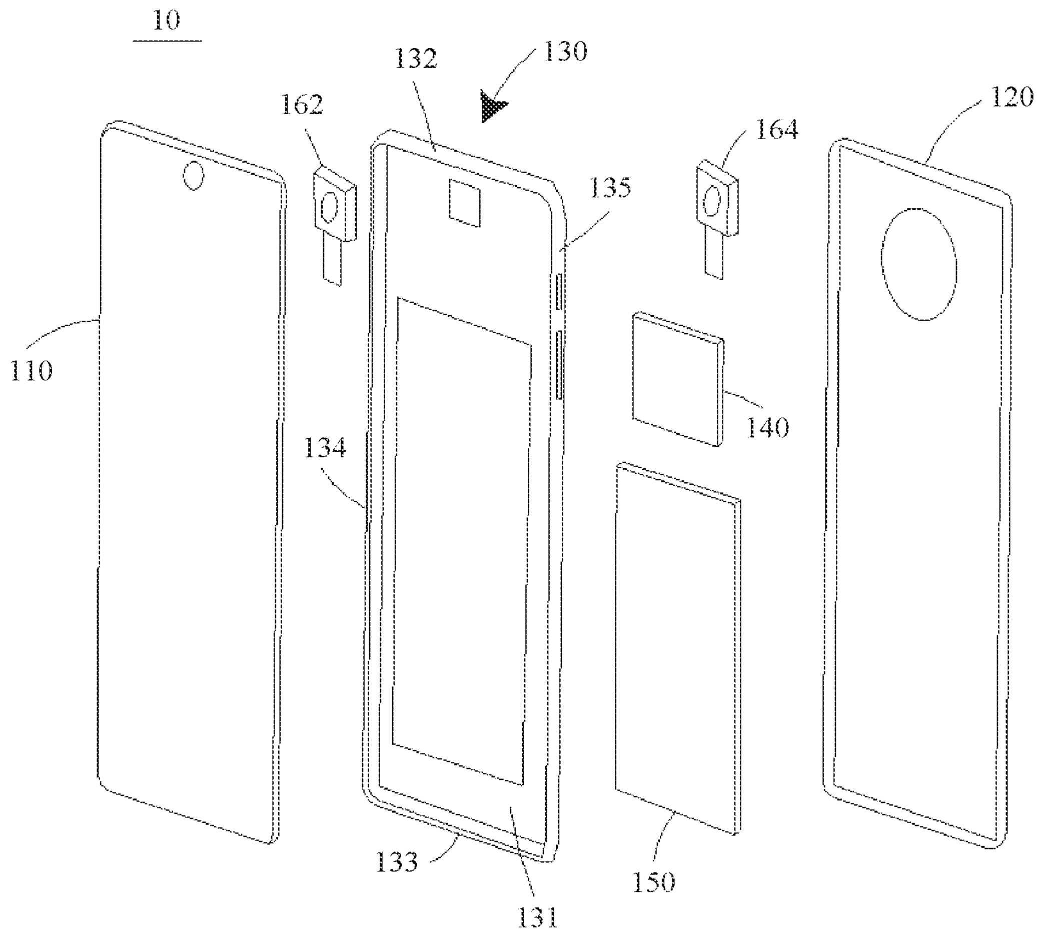
FIG. 2 is a schematic diagram of an exploded structure of an electronic device according to an embodiment of this application.

For example, FIG. 1 is a schematic diagram of an appearance of a terminal device 10 according to an embodiment of this application, and FIG. 2 is a schematic diagram of an exploded structure of a terminal device 10 according to an embodiment of this application. As shown in FIG. 1 and FIG. 2, the terminal device 10 includes a display 110, a rear cover 120, a middle bezel 130, a circuit board 140, and an energy storage module 150. The energy storage module 150 is a battery. The middle bezel 130, the circuit board 140, and the energy storage module 150 are disposed between the display 110 and the rear cover 120. The circuit board 140 and the energy storage module 150 may be disposed on the middle bezel 130, for example, the circuit board 140 and the energy storage module 150 are disposed on a surface that is of the middle bezel 130 and that faces the rear cover 120. In some other embodiments, the circuit board 140 and the energy storage module 150 may alternatively be disposed on a surface that is of the middle bezel 130 and that faces the display 110.

The energy storage module 150 may be connected to another component by using a power management module (power management unit, PMU) (not shown in the figure). The PMU may receive electrical energy output by the energy storage module 150, and supply power to a processor, an internal memory, an external memory, the display 110, a camera, a loudspeaker, a communication module, and the like in the terminal device 10. The processor herein includes a central processing unit (central processing unit, CPU), a graphics processing unit (graphics processing unit, GPU), a baseband processor, or the like. The PMU may be further configured to detect parameters such as a capacity, a quantity of cycles, a health state (leakage or impedance) of the energy storage module 150. In some embodiments, the PMU may be integrated into the circuit board 140.

The display 110 may be an organic light-emitting diode (organic light emitting diode, OLED), or a liquid crystal display (liquid crystal display, LCD). It should be understood that the display 110 may include a displayer and a touch component. The displayer is configured to output display content to a user, and the touch component is configured to receive a touch event entered by the user on the display 110.

The rear cover 120 may be a metal rear cover, a glass rear cover, a plastic rear cover, or a ceramic rear cover. A material of the rear cover 120 is not limited in this embodiment of this application.

The middle bezel 130 may include a metal plate 131 and a bezel. The bezel is disposed around an outer edge of the metal plate 131. Usually, the bezel may be a quadrate bezel. For example, as shown in FIG. 2, the bezel may include a top bezel 132 and a bottom bezel 133 that are disposed opposite to each other, and a left bezel 134 and a right bezel 135 that are disposed opposite to each other and are located between the top bezel 132 and the bottom bezel 133. In this embodiment, a side surface of the middle bezel 130 is a surface enclosed by the top bezel 132, the bottom bezel 133, the left bezel 134, and the right bezel 135. The metal plate 131 may be an aluminum plate, an aluminum alloy plate, or a magnesium alloy plate. Each bezel may be a metal bezel, a ceramic bezel, or a glass bezel. The metal middle bezel 130 may be welded to, engaged with, or integrated with the bezel, or the metal middle bezel 130 is connected to the bezel through injection molding of a plastic member.

The circuit board 140 is one of important components of the terminal device, and is a carrier necessary for software implementation. The circuit board 140 includes a substrate, a functional component mounted on the substrate, and another component mounted on the substrate. The functional component includes but is not limited to a PMU used for voltage conversion, a power amplifier (power amplifier, PA) used for signal amplification, a processor used for signal processing, a memory used for data storage, or a sensor (for example, a pressure sensor, a gyroscope sensor, a barometric pressure sensor, a magnetic sensor, an acceleration sensor, a distance sensor, an optical proximity sensor, a temperature sensor, an ambient light sensor, or a bone conduction sensor), or may be a timing controller used for display control of the display 110, or a component used for control and implementation of another function (for example, a charging function). A specific function of the functional component is not limited in this embodiment of this application. The another component includes but is not limited to a resistor, a capacitor, an inductor, a memory card, a sensor, or a shielding board. The circuit board 140 may further include an accessory used for fastening, for example, a nut or a bolt. The component may be mounted on the substrate by using a solder joint.

It may be understood that the circuit board 140 may have a convex position and/or a concave position based on different components. A specific shape of the circuit board 140, a position and a size of the component, and the like are related to a design layout of the terminal device. This is not specifically limited in this embodiment of this application.

In some embodiments, as shown in FIG. 2, the terminal device 10 may further include a camera and a camera flash (not shown in the figure). The camera may include a front-facing camera 162 and a rear-facing camera 164. The rear-facing camera 164 and the camera flash may be disposed on a surface that is of the metal plate 131 and that faces the rear cover 120, and mounting holes that can be used to mount the camera flash and the rear-facing camera 164 are disposed on the rear cover 120. The front-facing camera 162 may be disposed on a surface that is of the metal plate 131 and that faces the display 110. In some embodiments, the front-facing camera 162 disposed in the terminal device 10 may include one or more camera lenses, and the rear-facing camera 164 may also include one or more camera lenses.

The following describes a related technology in this application.

Figure 3:
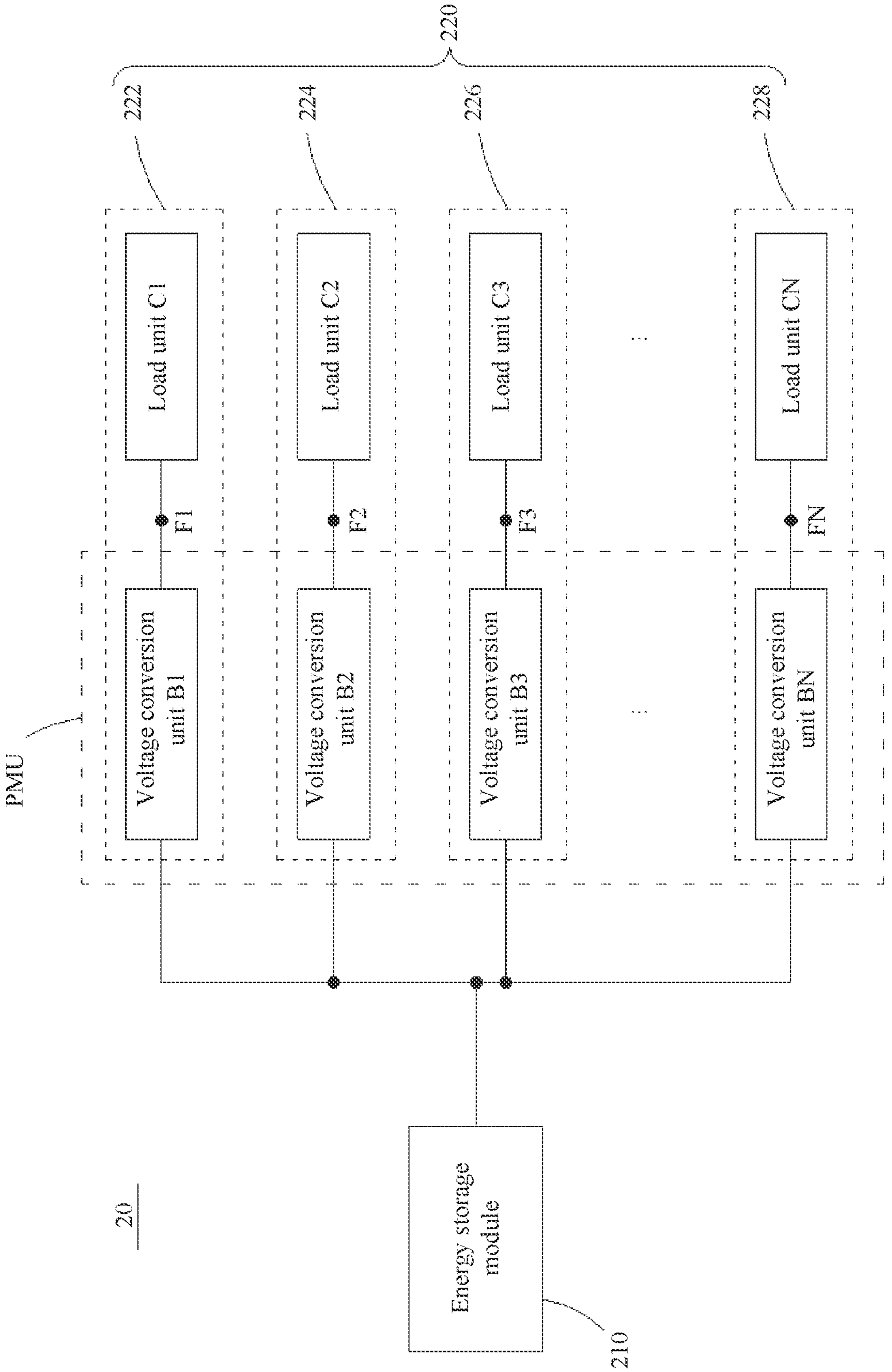
FIG. 3 is a schematic diagram of an internal structure of a terminal device in a related technology.

FIG. 3 is a schematic diagram of an internal structure of a terminal device 20 in a related technology. As shown in FIG. 3, the terminal device 20 includes an energy storage module 210 and a plurality of load modules 220. The plurality of load modules 220 shown in the figure include a first load module 222, a second load module 224, a third load module 226, . . . , and an Nth load module 228. Each load module 220 includes a voltage conversion unit and a load unit that are connected in series. To be specific, the first load module 222 includes a voltage conversion unit B1 and a load unit C1 that are connected in series, the second load module 224 includes a voltage conversion unit B2 and a load unit C2 that are connected in series, the third load module 226 includes a voltage conversion unit B3 and a load unit C3 that are connected in series, . . . , and the Nth load module 228 includes a voltage conversion unit BN and a load unit CN that are connected in series. Usually, a plurality of voltage conversion units (including the voltage conversion units B1, B2, B3, . . . , and BN) in the terminal device 20 as a whole constitute a PMU. In other words, the PMU includes a plurality of voltage conversion units. Each of the plurality of load units (including the load units C1, C2, C3, . . . , and CN) may be one of a CPU, a GPU, a baseband processor, an internal memory, an external memory, a display, a camera, a loudspeaker, and a communication module.

In the related technology, a process of detecting a standby capability of the terminal device 20 is specifically as follows: Before the terminal device 20 is assembled, power consumption of the load units on a circuit board is detected by using a power consumption test instrument. The terminal device 20 of the structure shown in FIG. 3 is used as an example. In the related technology, usually, a current value of the load unit C1 is detected at a point F1, to obtain power consumption of the load unit CL; a current value of the load unit C2 is detected at a point F2, to obtain power consumption of the load unit C2; a current value of the load unit C3 is detected at a point F3, to obtain power consumption of the load unit C3; . . . ; and a current value of the load unit CN is detected at a point FN, to obtain power consumption of the load unit CN.

However, in the process of detecting the standby capability of the terminal device 20 in the related technology, the used power consumption test instrument has problems that a size is large and the power consumption test instrument is bulky and inconvenient to carry. Consequently, this process can be performed only in a laboratory, and the standby capability of the terminal device 20 cannot be detected in real time. With development of science and technology, functions of the terminal device 20 are increasingly abundant, and application scenarios of the terminal device are increasing. In this case, a laboratory scenario gradually cannot represent an actual application scenario of a user. Based on this, to improve standby experience of the terminal device 20, a power consumption detection circuit is urgently needed to detect the standby capability of the terminal device 20 in real time.

Therefore, embodiments of this application provide a power consumption detection circuit, a power consumption detection chip, and a terminal device. The power consumption detection circuit is applied to the terminal device, and power consumption of each load module in the terminal device may be detected, so that a standby capability of the terminal device can be detected in real time.

The following describes in detail the power consumption detection circuit provided in the embodiments of this application. The power consumption detection circuit provided in the embodiments of this application may be applied to the terminal device shown in FIG. 3, to detect power consumption of each load module in the terminal device. In the embodiments of this application, a connection between two electronic components or/and electrical units is an electrical connection. The electrical connection herein means that an electrical signal can be transmitted through the connection between the two electronic components or/and electrical units. In addition, the electrical connection between the two electronic components or/and electrical units may be a direct connection implemented by using a conducting wire, or may be an indirect connection implemented by using another electronic component or/and electrical unit.

Figure 4:
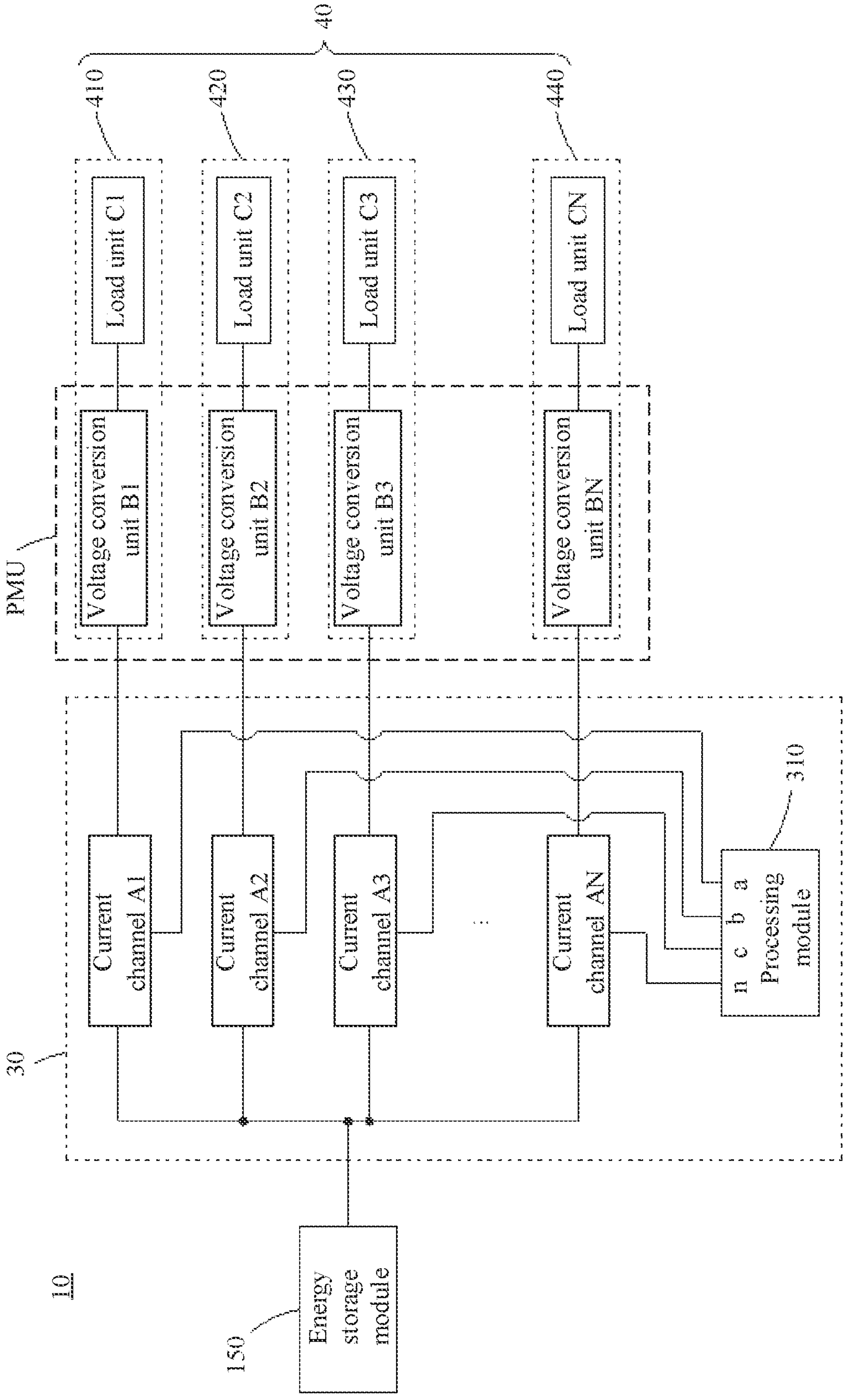
FIG. 4 is a schematic diagram of an internal structure of a terminal device according to an embodiment of this application.

FIG. 4 is a schematic diagram of an internal structure of a terminal device 10 according to an embodiment of this application. As shown in FIG. 4, a power consumption detection circuit 30 is applied to the terminal device 10. The terminal device 10 includes an energy storage module 150 and a plurality of load modules 40. The plurality of load modules 40 shown in the figure include a first load module 410, a second load module 420, a third load module 430, . . . , and an Nth load module 440. Each load module 40 includes a voltage conversion unit and a load unit that are connected in series. Usually, a plurality of voltage conversion units in the terminal device 10 may be presented as a whole, that is, as a PMU.

The power consumption detection circuit 30 includes a plurality of current channels and a processing module 310. A quantity of current channels is equal to a quantity of load modules 40 in the terminal device 10, and the plurality of current channels are in a one-to-one correspondence with the plurality of load modules 40. Each current channel has an input terminal and an output terminal. Input terminals of the plurality of current channels are configured to connect to the energy storage module 150, so that the energy storage module 150 can output a current to each current channel. The output terminal of each current channel is configured to connect to an input terminal of a corresponding load module 40. In any load module 40, an input terminal of the voltage conversion unit is an input terminal of the load module 40, and an output terminal of the voltage conversion unit is connected to the load unit, so that electrical energy output by the energy storage module 150 to the load module 40 is output to the load unit through the voltage conversion unit.

Specifically, the current channels shown in FIG. 4 include a current channel A1, a current channel A2, a current channel A3, . . . , and a current channel AN. The current channel A1 corresponds to the first load module 410. An input terminal of the current channel A1 is connected to the energy storage module 150, and an output terminal of the current channel A1 is connected to an input terminal of the first load module 410. That is, the output terminal of the current channel A1 is connected to an input terminal of a voltage conversion unit B1. An output terminal of the voltage conversion unit B1 is connected to a load unit C1. The current channel A2 corresponds to the second load module 420. An input terminal of the current channel A2 is connected to the energy storage module 150, and an output terminal of the current channel A2 is connected to an input terminal of the second load module 420. That is, the output terminal of the current channel A2 is connected to an input terminal of a voltage conversion unit B2. An output terminal of the voltage conversion unit B2 is connected to a load unit C2. The current channel A3 corresponds to the third load module 430. An input terminal of the current channel A3 is connected to the energy storage module 150, and an output terminal of the current channel A3 is connected to an input terminal of the third load module 430. That is, the output terminal of the current channel A3 is connected to an input terminal of a voltage conversion unit B3. An output terminal of the voltage conversion unit B3 is connected to a load unit C3, . . . , and the current channel AN corresponds to the Nth load module 440. An input terminal of the current channel AN is connected to the energy storage module 150, and an output terminal of the current channel AN is connected to an input terminal of the Nth load module 440. That is, the output terminal of the current channel AN is connected to an input terminal of a voltage conversion unit BN. An output terminal of the voltage conversion unit BN is connected to a load unit CN.

The processing module 310 has a detection terminal. The detection terminal of the processing module 310 is connected to each current channel. The processing module 310 is configured to perform the following steps S100 to S200 when operating.

S100: The processing module 310 detects a current value of each of the plurality of current channels.

The processing module 310 detects the current value of each current channel by using the detection terminal. In this embodiment of this application, the processing module 310 may have a plurality of detection terminals. A quantity of detection terminals of the processing module 310 may be equal to the quantity of current channels, the plurality of detection terminals are in a one-to-one correspondence with the plurality of current channels, and each detection terminal is configured to detect a current value of a corresponding current channel. Specifically, the detection terminals of the processing module 310 shown in FIG. 4 include a detection terminal a, a detection terminal b, a detection terminal c, and a detection terminal n. The detection terminal a of the processing module 310 is connected to the current channel A1, and is configured to detect a current value of the current channel A1. The detection terminal b of the processing module 310 is connected to the current channel A2, and is configured to detect a current value of the current channel A2. The detection terminal c of the processing module 310 is connected to the current channel A3, and is configured to detect a current value of the current channel A3. The detection terminal n of the processing module 310 is connected to the current channel AN, and is configured to detect a current value of the current channel AN.

S200: The processing module 310 determines power consumption of a corresponding load module 40 based on the current value of each current channel.

The power consumption of the load module 40 may be at least one of a current value of the load module 40, a power of the load module 40, and electrical energy used by the load module 40 within preset duration. The power of the load module 40 refers to electrical energy used by the load module 40 per unit time (for example, 1 second). The preset duration may be, for example, 10 seconds, 30 seconds, or 60 seconds.

For example, the power consumption of the load module 40 is the power of the load module 40. After detecting the current value of the current channel A1 by using the detection terminal a, the processing module 310 multiplies the current value of the current channel A1 by an input voltage value of the current channel A1, to obtain power consumption of the first load module 410 corresponding to the current channel A1. In this embodiment, a current input into the first load module 410 inevitably flows through the current channel A1 when the first load module 410 operates. Therefore, to obtain more realistic and accurate power consumption data, the power consumption of the first load module 410 that is calculated based on the input voltage value of the current channel A1 actually further includes power consumption of the current channel A1. In some other embodiments, the current value of the current channel A1 may alternatively be multiplied by an output voltage value of the current channel A1, to obtain the power consumption of the first load module 410. In this case, the calculated power consumption of the first load module 410 does not include the power consumption of the current channel A1. Details are not described again.

According to same operational logic, the processing module 310 multiplies the current value of the current channel A2 by an input voltage value of the current channel A2, to obtain power consumption of the second load module 420 corresponding to the current channel A2, . . . , and the processing module 310 multiplies the current value of the current channel AN by an input voltage value of the current channel AN, to obtain power consumption of the Nth load module 440 corresponding to the current channel AN. The input voltage value of the current channel A1, the input voltage value of the current channel A2, . . . , and the input voltage value of the current channel AN each are an output voltage value of the energy storage module 150. The processing module 310 may obtain the output voltage value of the energy storage module 150 through detection.

If the power consumption of the load module 40 is the electrical energy used by the load module 40 within the preset duration, after detecting the current value of the current channel A1 by using the detection terminal a, the processing module 310 multiplies the current value of the current channel A1 by an input voltage value of the current channel A1 to obtain a power of the first load module 410, and then multiplies the power of the first load module 410 by the preset duration, to obtain power consumption of the first load module 410 corresponding to the current channel A1. In some other embodiments, after obtaining the power of the first load module 410, the processing module 310 may alternatively integrate the power of the first load module 410 to obtain the power consumption of the first load module 410. Details are not described again.

According to same operational logic, the processing module 310 multiplies the current value of the current channel A2 by an input voltage value of the current channel A2 to obtain a power of the second load module 420, and then multiplies the power of the second load module 420 by the preset duration, to obtain power consumption of the second load module 420 corresponding to the current channel A2, . . . , and the processing module 310 multiplies the current value of the current channel AN by an input voltage value of the current channel AN to obtain a power of the Nth load module 440, and then multiplies the power of the Nth load module 440 by the preset duration, to obtain power consumption of the Nth load module 440 corresponding to the current channel AN.

When the power consumption detection circuit 30 provided in this embodiment of this application is applied to the terminal device 10, power consumption of each load module 40 in the terminal device 10 can be detected. Based on this, a standby capability of the terminal device 10 can be detected in real time. In addition, when the power consumption detection circuit 30 is applied to the terminal device 10, the power consumption of each load module 40, that is, total power consumption of the voltage conversion unit and the load unit in each load module 40, is detected. When the load unit operates, the voltage conversion unit connected to the load unit also needs to operate. Therefore, compared with detecting only power consumption of the load unit, more realistic and accurate power consumption data can be obtained by detecting the total power consumption of the voltage conversion unit and the load unit, thereby more precisely detecting the standby capability of the terminal device 10. The processing module 310 is integrated in the power consumption detection circuit 30, so that the power consumption detection circuit 30 operates without relying on a system on chip in the terminal device 10. In this way, when the terminal device 10 is in a power-off state, the power consumption detection circuit 30 may also run independently. When the power consumption detection circuit 30 operates, the processing module 310 may simultaneously detect the current value of each of the plurality of current channels, to obtain the power consumption of the load module 40 corresponding to each current channel. In this way, it can be ensured that a sum of a plurality of current values detected by the processing module 310 is equal to a value of a total current that is output by the energy storage module 150 to the load modules 40, thereby more precisely detecting the standby capability of the terminal device 10.

Usually, in the terminal device 10, the voltage conversion units in the PMU are buck (BUCK) units. That is, for any voltage conversion unit, an input voltage of the voltage conversion unit is greater than an output voltage. When the power of the load unit remains unchanged, an input current of the voltage conversion unit is less than an output current of the voltage conversion unit. Based on this, compared with a case in which the current channel is connected between the output terminal of the voltage conversion unit and the load unit, when the current channel is connected between the energy storage module 150 and the input terminal of the voltage conversion unit, the current channel causes a fewer electrical energy loss. For example, the load unit C1 is a CPU. An input voltage of the voltage conversion unit B1 is about 3.5 V (volts) to 4.5 V, and an output voltage of the voltage conversion unit B1 is about 0.5 V. In this case, when a power loss of the voltage conversion unit B1 is not considered, $$I_1 = \frac{P_{C1}}{U_1}.$$

$I_1$ is an input current value of the voltage conversion unit B1, $P_{C1}$ is a $$I_2 = \frac{P_{C1}}{U_2}$$

power of the load unit C1, $U_1$ is the input voltage of the voltage conversion unit B1, $I_2$ is an output current of the voltage conversion unit B1, and $U_2$ is the output voltage of the voltage conversion unit B1.

Because the voltage conversion unit B1 is a BUCK unit, that is, $U_1>U_2$, $I_1<I_2$ can be obtained.

When the current channel A1 is connected between the energy storage module 150 and the input terminal of the voltage conversion unit B1, an electrical energy loss caused by the current channel A1 is:

$$P_1 = I_1^2 R.$$

When the current channel A1 is connected between the output terminal of the voltage conversion unit B1 and the load unit C1, an electrical energy loss caused by the current channel A1 is:

$$P_2 = I_2^2 R.$$

R is a resistance value of the current channel A1. Because $I_1<I_2$, $P_1<P_2$. That is, when the current channel A1 is connected between the energy storage module 150 and the input terminal of the voltage conversion unit B1, the current channel A1 causes a fewer electrical energy loss.

It may be understood that, in this embodiment of this application, one electrical module (for example, the load module 40) or electrical unit (for example, the voltage conversion unit or the load unit) may include a plurality of electronic components, and these electronic components are interconnected. However, in the terminal device 10, the plurality of electronic components in the electrical module or electrical unit are not necessarily encapsulated together. For example, the voltage conversion unit and the load unit in any load module 40 are not necessarily encapsulated together, or the plurality of voltage conversion units may be encapsulated together to form the PMU.

It should be understood that, in the foregoing embodiment, for ease of understanding, the energy storage module 150 and the load module 40 are introduced to describe a connection manner and an operation process of the power consumption detection circuit 30 provided in this embodiment of this application. Actually, the power consumption detection circuit 30 provided in this embodiment of this application does not include the energy storage module 150 and the load module 40. That is, the energy storage module 150 and the load module 40 exist as environmental elements relative to the power consumption detection circuit 30 provided in this embodiment of this application, and should not be understood as limiting the power consumption detection circuit 30 provided in this embodiment of this application.

In some embodiments, the processing module 310 is further configured to perform the following steps S001 and S002 when operating.

S001: If the processing module 310 receives a third instruction, the processing module 310 performs steps S100 and S200.

S002: if the processing module 310 receives a fourth instruction, the processing module 310 stops performing step S100.

The third instruction is used to instruct the processing module 310 to start detecting the power consumption of the load module 40 corresponding to each current channel. The fourth instruction is used to instruct the processing module 310 to stop detecting the power consumption of the load module 40 corresponding to each current channel. The processing module 310 performs steps S100 and S200 only after receiving the third instruction. That is, the processing module 310 starts to detect the current value of each current channel only after receiving the third instruction, and determines the power consumption of the corresponding load module 40 based on the current value of each current channel. The processing module 310 stops performing step S100 after receiving the fourth instruction. That is, the processing module 310 stops detecting the current value of each current channel after receiving the fourth instruction. In this case, the processing module 310 no longer detects the power consumption of the load module 40 corresponding to each current channel. In this way, the processing module receives the third instruction to start operating, and receives the fourth instruction to stop operating, thereby avoiding electrical energy waste caused by continuous operation of the processing module 310. In some other embodiments, the third instruction may also be used to instruct the processing module 310 to start detecting power consumption of the load module 40 corresponding to any one or more current channels. In this case, when receiving the third instruction, the processing module 310 may detect a current value of any one or more current channels according to the third instruction, and then determine power consumption of a corresponding load module 40 based on the detected current value of the current channel. The fourth instruction may also be used to instruct the processing module 310 to stop detecting the power consumption of the load module 40 corresponding to any one or more current channels. In this case, when receiving the fourth instruction, the processing module 310 may stop detecting the current value of any one or more current channels according to the fourth instruction.

Figure 5:
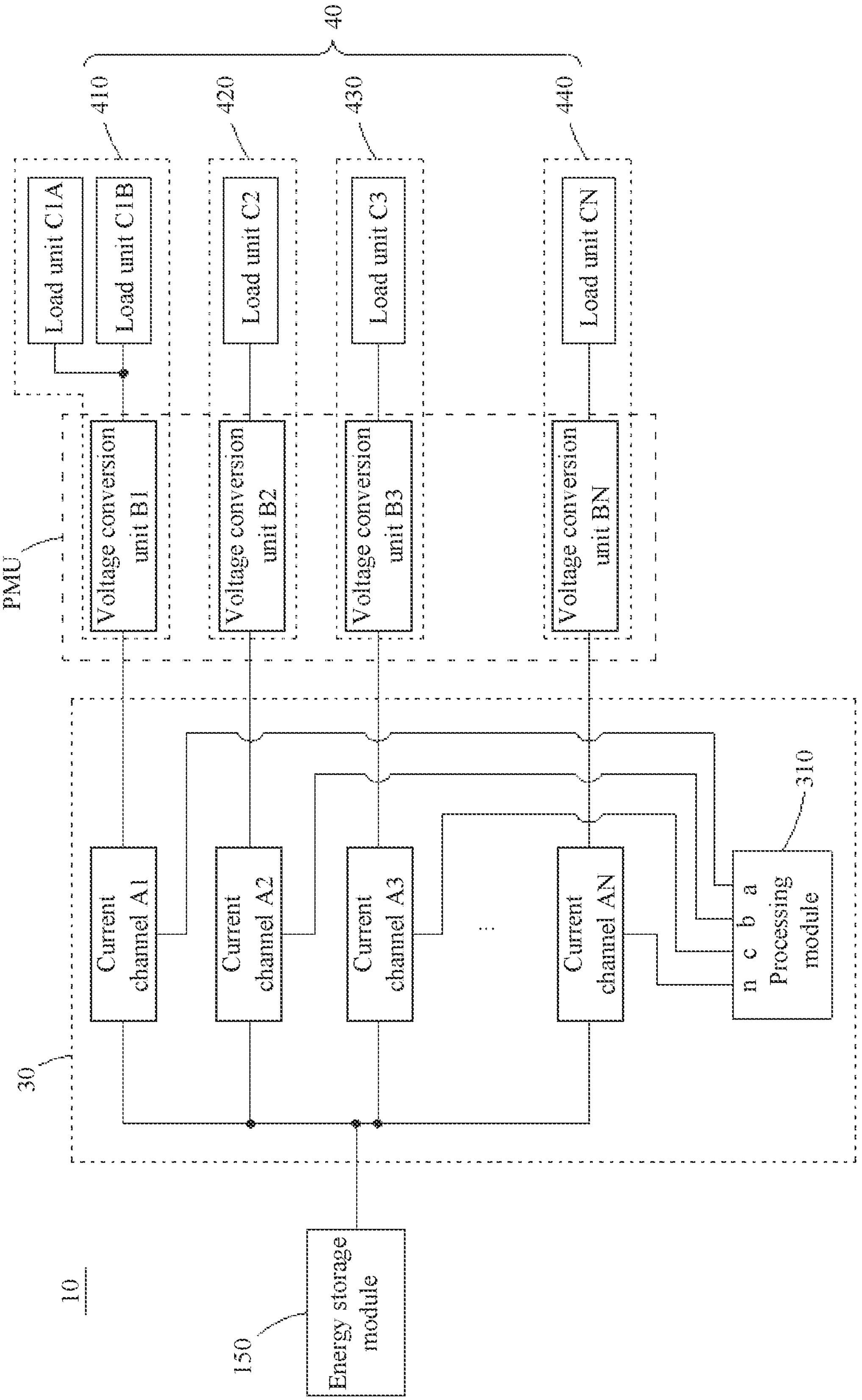
FIG. 5 is a schematic diagram of an internal structure of a second terminal device according to an embodiment of this application.

In some embodiments, any load module 40 may include one voltage conversion unit and a plurality of load units. Herein, "a plurality of" refers to two or more. FIG. 5 is a schematic diagram of an internal structure of another terminal device 10 according to an embodiment of this application, and shows a scenario in which the first load module 410 includes two load units.

Specifically, in the embodiment shown in FIG. 5, the first load module 410 includes a voltage conversion unit B1, a load unit C1A, and a load unit C1B. The output terminal of the current channel A1 is connected to an input terminal of the voltage conversion unit B1, and an output terminal of the voltage conversion unit B1 is connected to the load unit C1A and the load unit C1B. That is, both the load unit C1A and the load unit C1B are connected in series to the voltage conversion unit B1.

In this case, if only the load unit C1A in the load unit C1A and the load unit C1B operates at a same time, the processing module 310 may perform the foregoing steps S100 and S200 to obtain power consumption of the first load module 410 when the load unit C1A operates. If only the load unit C1B in the load unit C1A and the load unit C1B operates at a same time, the processing module 310 may perform the foregoing steps S100 and S200 to obtain power consumption of the first load module 410 when the load unit C1B operates.

In this embodiment, the processing module 310 is further configured to perform the following step S003 when operating: when the load unit C1A and the load unit C1B simultaneously operate, determining power consumption of the load unit C1A based on the current value of the current channel A1 and a first preset ratio, and determining power consumption of the load unit C1B based on the current value of the current channel A1 and a second preset ratio.

The first preset ratio is a ratio of the power consumption of the load unit C1A to power consumption of the first load module 410 when the load unit C1A and the load unit C1B simultaneously operate. The second preset ratio is a ratio of the power consumption of the load unit C1B to the power consumption of the first load module 410 when the load unit C1A and the load unit C1B simultaneously operate. The first preset ratio and the second preset ratio may be pre-stored in the processing module 310. In this way, when one load module 40 includes a plurality of load units, and the plurality of load units simultaneously operate, power consumption of each load unit may also be calculated. Because one load module 40 includes a plurality of load units, the quantity of current channels can be reduced, to achieve an objective of saving costs.

In some embodiments, when the processing module 310 operates, and when the power consumption of the load module 40 corresponding to any current channel is obtained, the power consumption of each load module 40 that is obtained each time may be further associated with time. In this way, when the power consumption detection circuit is applied to the terminal device 10, the terminal device 10 may easily display a change relationship of the power consumption of each load module 40 over time.

Figure 6:
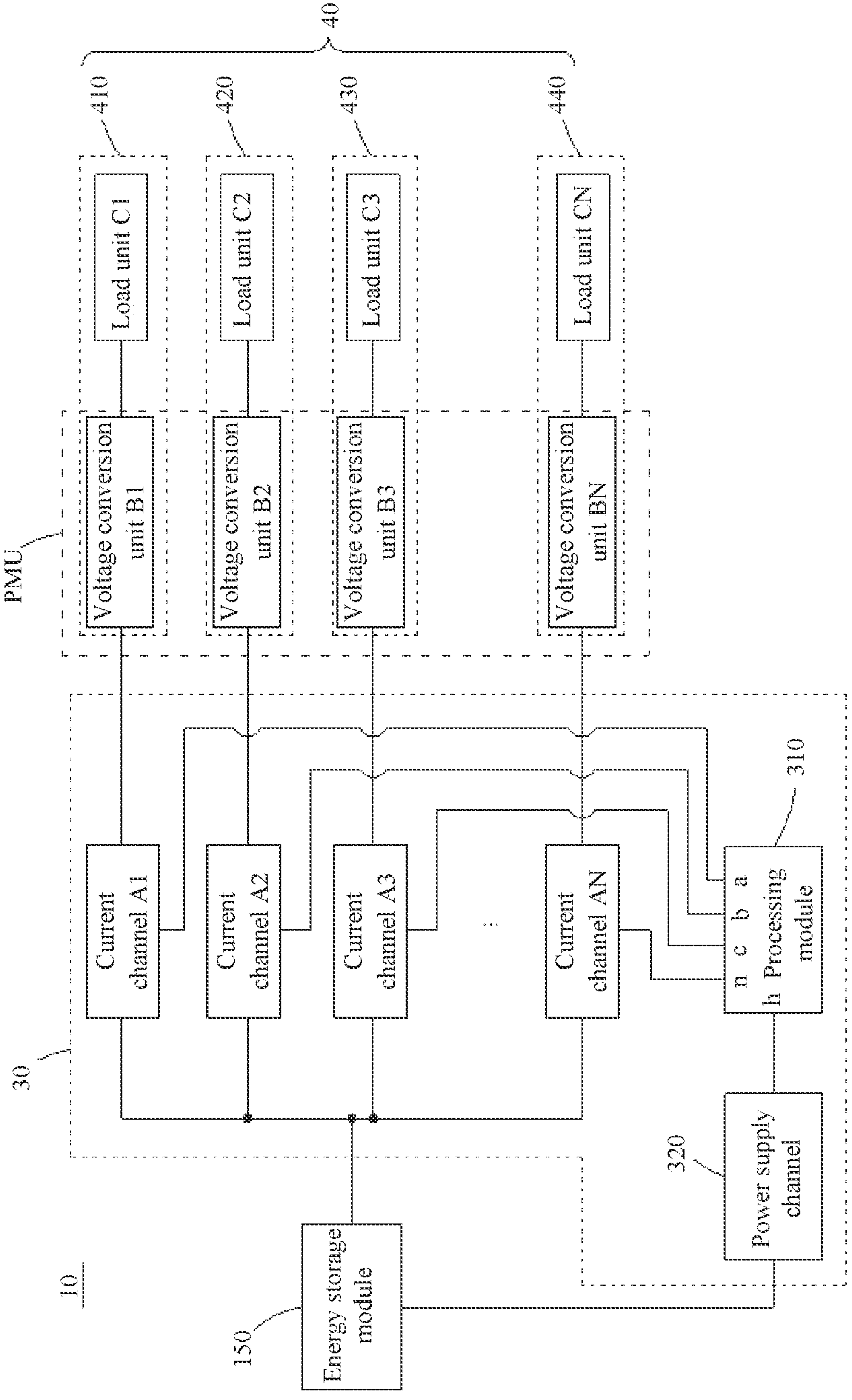
FIG. 6 is a schematic diagram of an internal structure of a third terminal device according to an embodiment of this application.

FIG. 6 is a schematic diagram of an internal structure of another terminal device 10 according to an embodiment of this application. As shown in FIG. 6, in some embodiments, the processing module 310 further has a power supply terminal h, and the power supply terminal h of the processing module 310 is configured to input electrical energy. The power consumption detection circuit 30 may further include a power supply channel 320. An input terminal of the power supply channel 320 is connected to the energy storage module 150, and an output terminal of the power supply channel 320 is connected to the power supply terminal h of the processing module 310. In this way, a power supply module may supply power to the processing module 310 through the power supply channel 320. In some specific embodiments, the power supply channel 320 may be another voltage conversion unit different from the voltage conversion unit B1, the voltage conversion unit B2, the voltage conversion unit B3, . . . , and the voltage conversion unit BN. The power supply channel 320 may be a boost (BOOST) unit, or may be a BUCK unit. This is not limited. It may be understood that when the processing module 310 includes a plurality of electrical units or/and electronic components that require power supply, the power supply channel 320 can supply power, when operating, to all the electrical units or/and electronic components that require power supply in the processing module 310.

In this embodiment, the processing module 310 in the power consumption detection circuit 30 is separately powered through the power supply channel 320, but is not powered through a current path. That is, the energy storage module 150 separately supplies power to the processing module 310 in the power consumption detection circuit 30, and power consumption of the power consumption detection circuit 30 is not included in the power consumption of the load module 40 that is detected by the processing module 310. In this way, more realistic and accurate power consumption data of the load modules 40 during operation of the terminal device 10 can be obtained, thereby more precisely detecting the standby capability of the terminal device 10.

With reference to the accompanying drawings, the following describes in detail a specific structure and an operation process of the power consumption detection circuit 30 in two possible implementations.

1. In a first possible implementation, any current channel includes a sampling resistor.

Figure 7:
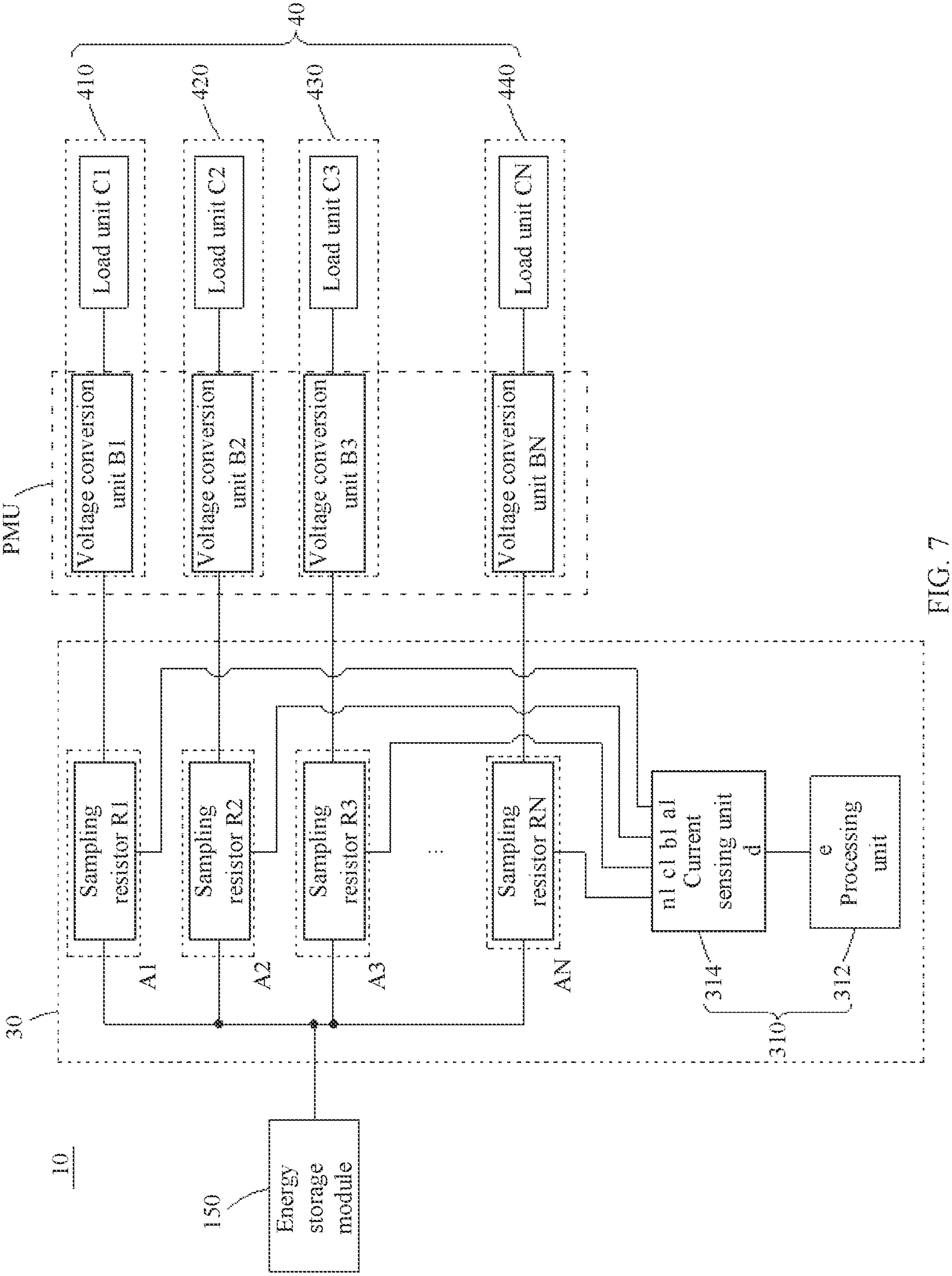
FIG. 7 is a schematic diagram of an internal structure of a fourth terminal device according to an embodiment of this application.

FIG. 7 is a schematic diagram of an internal structure of still another terminal device 10 according to an embodiment of this application. As shown in FIG. 7, a current channel may include a sampling resistor. A first terminal of the sampling resistor is configured to connect to the energy storage module 150, and a second terminal of the sampling resistor is configured to connect to an input terminal of a load module 40 corresponding to the current channel.

Specifically, as shown in FIG. 7, the current channel A1 may include a sampling resistor R1, the current channel A2 may include a sampling resistor R2, the current channel A3 may include a sampling resistor R3, . . . , and the current channel AN may include a sampling resistor RN. In this case, first terminals of the sampling resistor R1, the sampling resistor R2, the sampling resistor R3, . . . , and the sampling resistor RN are all configured to connect to the energy storage module 150. A second terminal of the sampling resistor R1 is connected to the input terminal of the first load module 410. A second terminal of the sampling resistor R2 is connected to the input terminal of the second load module 420. A second terminal of the sampling resistor R3 is connected to the input terminal of the third load module 430. A second terminal of the sampling resistor RN is connected to the input terminal of the Nth load module 440.

In this embodiment, the processing module 310 includes a current sensing unit 314 and a processing unit 312. The current sensing unit 314 has a detection terminal and an output terminal d, the detection terminal of the current sensing unit 314 is connected to the sampling resistor in each current channel, and the output terminal d of the current sensing unit 314 is connected to an input terminal e of the processing unit 312. The current sensing unit 314 is configured to perform the following steps S112 to S116 when operating.

S112: The current sensing unit 314 detects a voltage value of the sampling resistor.

S114: The current sensing unit 314 determines a current value of the current channel based on the voltage value of the sampling resistor.

S116: The current sensing unit 314 sends the current value of the current channel to the processing unit 312.

The current sensing unit 314 may detect a voltage value of the sampling resistor in each current channel by using the detection terminal, and determine the current value of each current channel based on the voltage value of the sampling resistor in the current channel. That is, the detection terminal of the current sensing unit 314 is the detection terminal of the processing module 310. In this embodiment of this application, to detect the voltage value of the sampling resistor in each current channel, the current sensing unit 314 may have a plurality of detection terminals. A quantity of detection terminals of the current sensing unit 314 may be equal to the quantity of current channels, the plurality of detection terminals are in a one-to-one correspondence with the plurality of current channels, and each detection terminal is configured to detect a voltage value of a sampling resistor in a corresponding current channel. Specifically, the detection terminals of the current value sensing unit shown in FIG. 7 include a detection terminal a1, a detection terminal b1, a detection terminal c1, and a detection terminal n1. The detection terminal a1 of the current sensing unit 314 is connected to the sampling resistor R1 in the current channel A1, and is configured to detect a voltage value of the sampling resistor R1. A resistance value of the sampling resistor R1 may be preset in the current sensing unit 314. In this way, after detecting the voltage value of the sampling resistor R1, the current sensing unit 314 divides the voltage value of the sampling resistor R1 by the resistance value of the sampling resistor R1 to obtain the current value of the current channel A1. The current sensing unit 314 may also obtain the current values of the current channel A2, the current channel A3, . . . , and the current channel AN according to a same principle. After obtaining the current value of any current channel, the current sensing unit 314 outputs the current value of the current channel to the processing unit 312.

Figure 8:
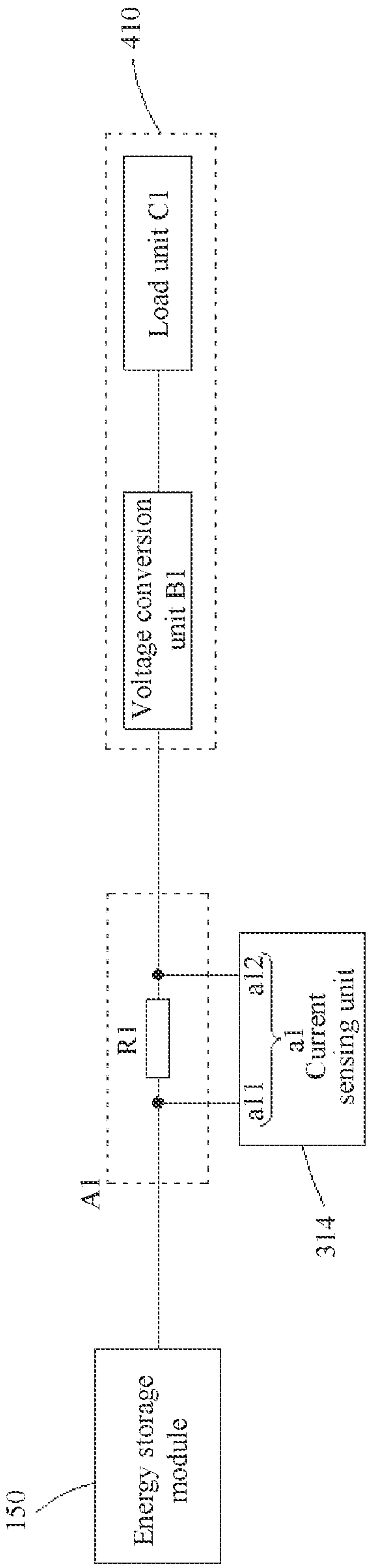
FIG. 8 is a schematic diagram of a connection between a current sensing unit and a sampling resistor according to an embodiment of this application.

It may be understood that a connecting line between the detection terminal a1 of the current sensing unit 314 and the sampling resistor R1 in FIG. 7 is merely used to indicate that there is a connection relationship between the two, and is not used to specifically limit a connection manner between the detection terminal a1 of the current sensing unit 314 and the sampling resistor R1. In some specific embodiments, the connection manner between the detection terminal a1 of the current sensing unit 314 and the sampling resistor R1 may be shown in FIG. 8. To be specific, the detection terminal a1 of the current sensing unit 314 includes a port a11 and a port a12. The port a11 is connected to the first terminal of the sampling resistor R1, and the port a12 is connected to the second terminal of the sampling resistor R1, to detect the voltage value of the sampling resistor R1. Similarly, connecting lines between other detection terminals (including the detection terminal b1, the detection terminal c1, and the detection terminal n1) of the current sensing unit 314 and sampling resistors in corresponding current channels in FIG. 7 are merely used to indicate connection relationships.

The processing unit 312 is configured to perform the following step S212: The processing unit 312 determines power consumption of the corresponding load module 40 based on the current value of the current channel.

As described above, the power consumption of the load module 40 may be at least one of the current value of the load module 40, the power of the load module 40, and the electrical energy used by the load module 40 within the preset duration.

In a first embodiment, the power consumption of the load module 40 is the current value of the load module 40. In this case, after receiving the current value of the current channel, the processing unit 312 may directly determine the current value of the current channel as the power consumption of the corresponding load module 40. Details are not described again.

In a second embodiment, the power consumption of the load module 40 is the power of the load module 40. In this case, step S212 performed by the processing unit 312 may be specifically as follows: The processing unit 312 detects an input voltage value of the current channel, and determines the power consumption of the corresponding load module 40 based on the current value and the input voltage value of the current channel.

In this embodiment, the processing unit 312 may detect a voltage value of the first terminal of any one of the sampling resistor R1, the sampling resistor R2, the sampling resistor R3, . . . , and the sampling resistor RN, that is, an input voltage value of each current channel, by using the current sensing unit 314. After obtaining the current value and the input voltage value of any current channel, the processing unit 312 multiplies the current value of the current channel by the input voltage value to obtain the power consumption of the load module 40 corresponding to the current channel.

The foregoing step S212 may be implemented by the processing unit 312 by using a software algorithm, or may be implemented by using a hardware structure. When step S212 is implemented by using the hardware structure, the processing unit 312 may be a multiplier formed by a multiplication circuit. A first input terminal of the multiplier is connected to the output terminal d of the current sensing unit 314, and is configured to input the current value of the current channel. A second input terminal of the multiplier is configured to input the input voltage value of the current channel. When operating, the multiplier can multiply data input by the first input terminal by data input by the second input terminal, that is, the current value of the current channel is multiplied by the input voltage value. In this way, the power of the corresponding load module 40 can be obtained, that is, the power consumption of the corresponding load module 40 can be obtained. When step S212 is implemented by using the hardware structure, power consumption generated when the processing unit 312 operates may be reduced.

In a third embodiment, the power consumption of the load module 40 is the electrical energy used by the load module 40 within the preset duration. In this case, step S212 performed by the processing unit 312 may be specifically as follows: The processing unit 312 detects an input voltage value of the current channel, and determines the power consumption of the corresponding load module 40 based on the current value and the input voltage value of the current channel. In this embodiment, the processing unit 312 may multiply the current value of the current channel by the input voltage value to obtain the power of the load module 40 corresponding to the current channel, and then integrate the power of the load module 40 to obtain the electrical energy used by the load module 40 within the preset duration, that is, obtain the power consumption of the load module 40. This step may also be implemented by the processing unit 312 by using a software algorithm, or may be implemented by using a hardware structure. When this step is implemented by using the hardware structure, the internal structure of the terminal device 10 may be shown in FIG. 9.

Figure 9:
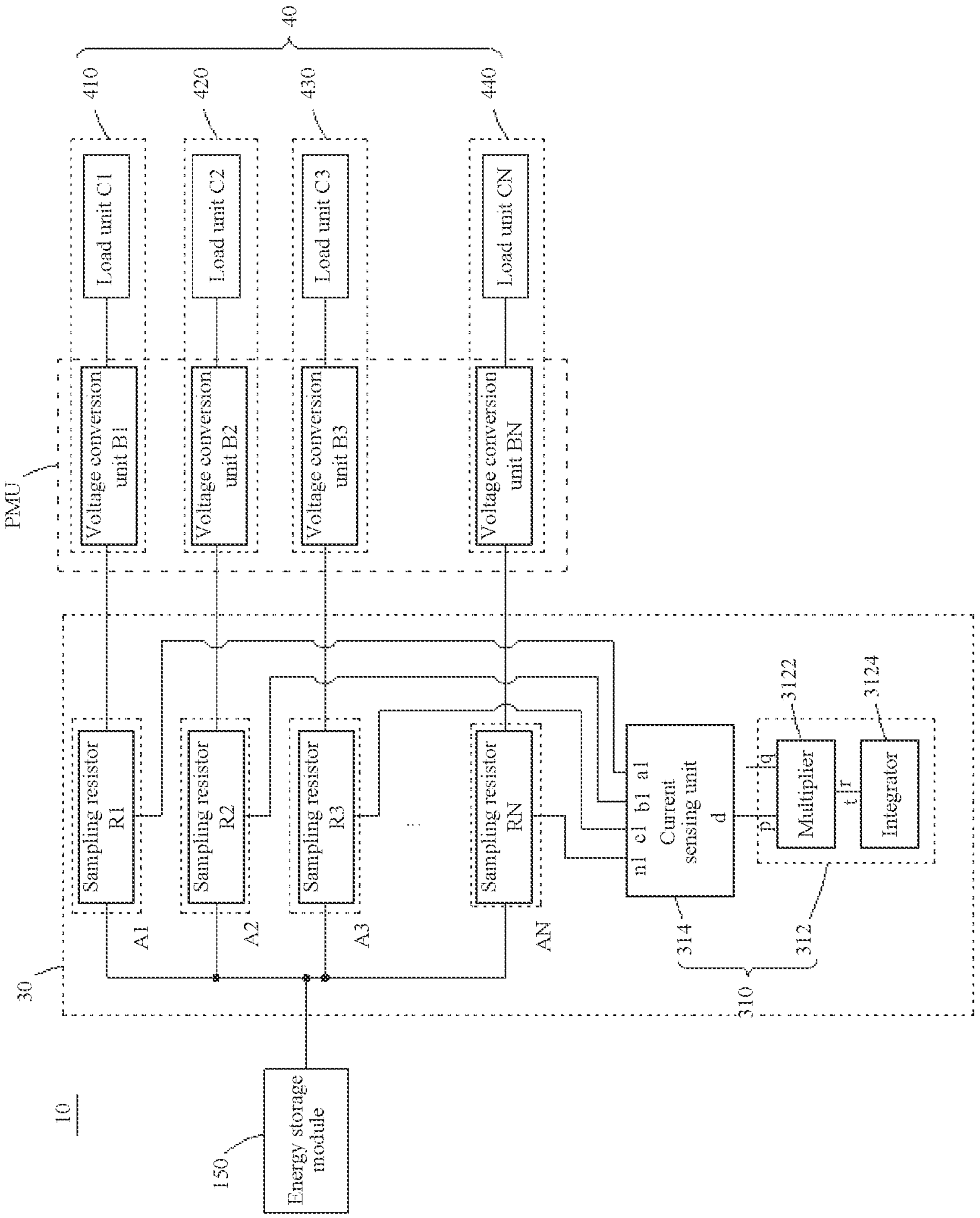
FIG. 9 is a schematic diagram of an internal structure of a fifth terminal device according to an embodiment of this application.

As shown in FIG. 9, the processing unit 312 may include a multiplier 3122 and an integrator 3124. A first input terminal p of the multiplier 3122 is connected to the output terminal d of the current sensing unit 314, and is configured to input the current value of the current channel. A second input terminal q of the multiplier 3122 is configured to input the input voltage value of the current channel, and an output terminal r of the multiplier 3122 is connected to an input terminal t of the integrator 3124. The multiplier 3122 is configured to multiply the current value of the current channel by the input voltage value to obtain the power of the corresponding load module 40, and the integrator 3124 is configured to integrate the power of the load module 40 to obtain the electrical energy used by the load module 40 within the preset duration, that is, obtain the power consumption of the load module 40. In this embodiment, the second input terminal q of the multiplier 3122 may also detect the voltage value of the first terminal of any one of the sampling resistor R1, the sampling resistor R2, the sampling resistor R3, . . . , and the sampling resistor RN by using the current sensing unit 314, to obtain the input voltage value of each current channel. Details are not described again.

It may be understood that, in this embodiment of this application, a specific implementation of the sampling resistor is not limited. In some embodiments, the sampling resistor may be a resistor with a fixed resistance value. In some other embodiments, the sampling resistor may alternatively be a piece of copper sheet, a copper wire, an iron wire, an aluminum wire, or the like.

2. In a second possible implementation, any current channel includes a first shunt unit 332.

Figure 10:
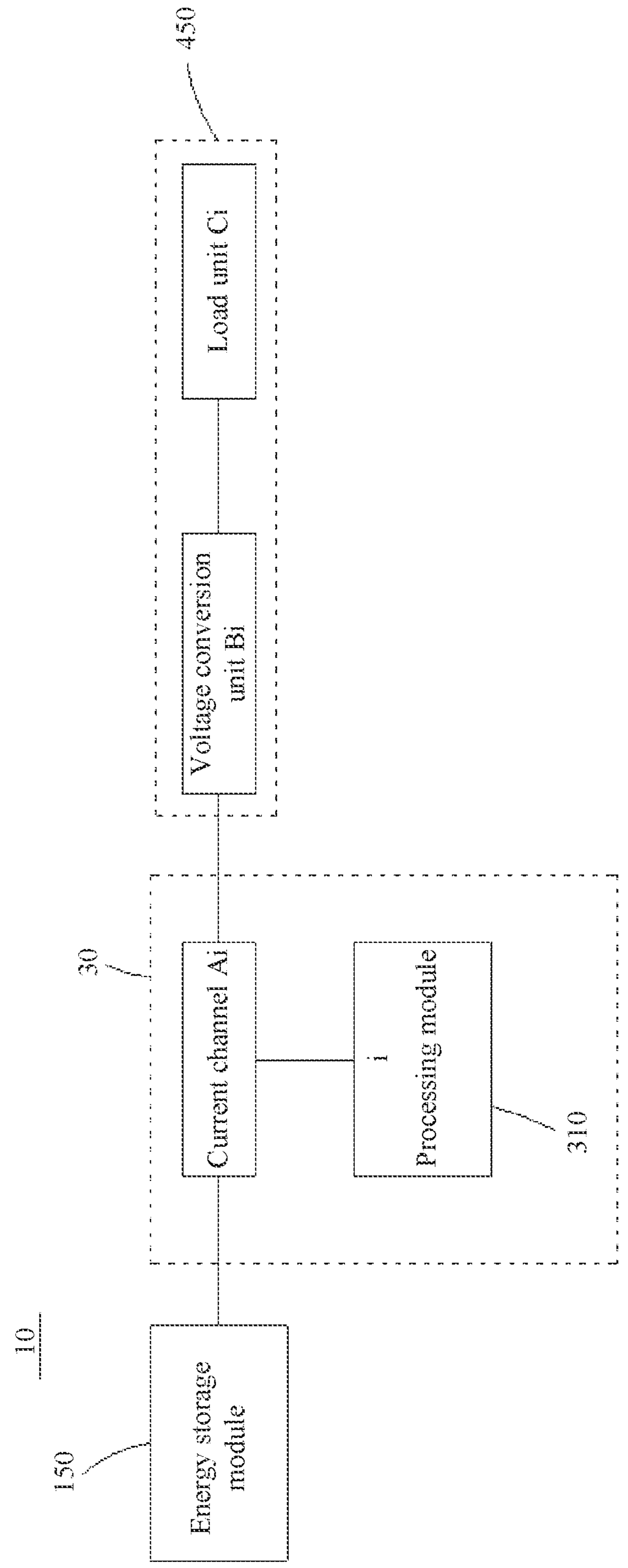
FIG. 10 is a simplified diagram of an internal structure of a terminal device according to an embodiment of this application.

FIG. 10 is a simplified diagram of an internal structure of a terminal device 10 according to an embodiment of this application. The plurality of load modules 40 in FIG. 4 are simplified as an ith load module 450, and the plurality of current channels in FIG. 4 are simplified as a current channel Ai. The ith load module 450 may be any one of the first load module 410, the second load module 420, the third load module 430, . . . , and the Nth load module 440. The ith load module 450 includes a voltage conversion unit Bi and a load unit Ci that are connected in series. The current channel Ai may be any one of the current channel A1, the current channel A2, the current channel A3, . . . , and the current channel AN. The current channel Ai corresponds to the ith load module 450. The processing module 310 has a detection terminal i, and the detection terminal i of the processing module 310 is connected to the current channel Ai, to detect a current value of the current channel Ai. It may be understood that, in the embodiment shown in FIG. 10, a connecting line between the detection terminal i of the processing module 310 and the current channel Ai is also merely used to indicate that there is a connection relationship between the two, but is not used to specifically limit a connection manner between the detection terminal i of the processing module 310 and the current channel Ai. In this possible implementation, a structure of the terminal device 10 shown in FIG. 10 is used as an example to describe specific structures and operation processes of the current channel and the processing module 310 in the power consumption detection circuit 30.

Figure 11:
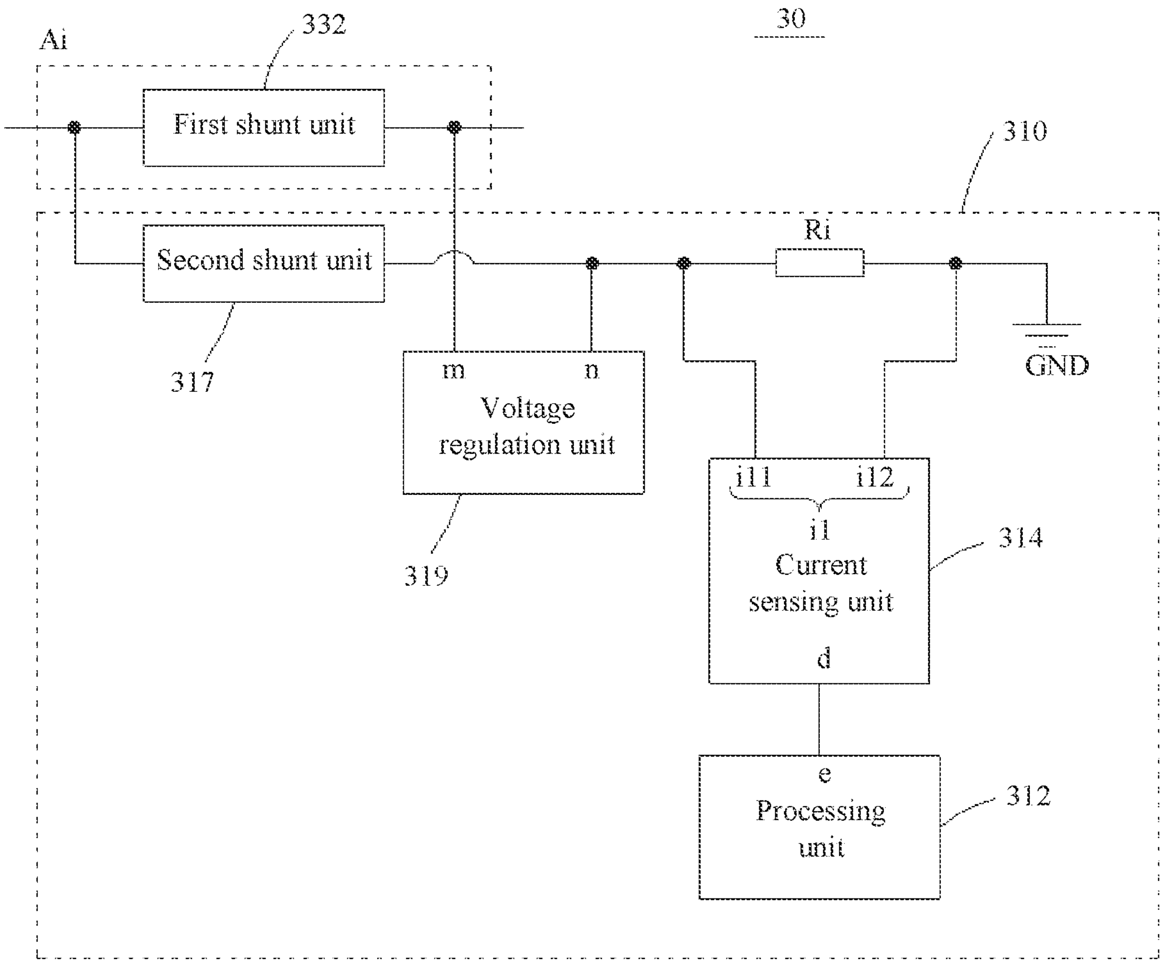
FIG. 11 is a schematic diagram of a structure of a first power consumption detection circuit according to an embodiment of this application.

FIG. 11 is a schematic diagram of a structure of a power consumption detection circuit 30 according to an embodiment of this application. As shown in FIG. 11, the current channel Ai includes a first shunt unit 332. A first terminal of the first shunt unit 332 is configured to connect to the energy storage module 150, and a second terminal of the first shunt unit 332 is configured to connect to an input terminal of the ith load module 450. The ith load module 450 is a load module 40 corresponding to the current channel Ai.

In this embodiment, the processing module 310 includes a second shunt unit 317, a voltage regulation unit 319, a sampling resistor R1, a current sensing unit 314, and a processing unit 312.

A first terminal of the second shunt unit 317 is connected to the first terminal of the first shunt unit 332, so that a voltage value of the first terminal of the second shunt unit 317 is equal to a voltage value of the first terminal of the first shunt unit 332. The voltage regulation unit 319 has a first terminal m and a second terminal n. When the processing module 310 operates, voltage values of the first terminal m and the second terminal n of the voltage regulation unit 319 are equal. The second terminal of the first shunt unit 332 is connected to the first terminal m of the voltage regulation unit 319, and a second terminal of the second shunt unit 317 is connected to the second terminal n of the voltage regulation unit 319. That is, when the voltage regulation unit 319 operates, a voltage value of the second terminal of the first shunt unit 332 is equal to a voltage value of the second terminal of the second shunt unit 317. In this way, when the processing module 310 operates, the voltage values of the two terminals of the first shunt unit 332 are equal to the voltage values of the two terminals of the second shunt unit 317.

In this case, when the processing module 310 operates, a current value of the first shunt unit 332 is $$I_a = \frac{U}{R_a}.$$

$I_a$ is the current value of the first shunt unit 332, that is, an input current value of the voltage conversion unit Bi, U is the voltage value of each of the two terminals of the first shunt unit 332, and $R_a$ is a resistance value of the first shunt unit 332.

A current value of the second shunt unit 317 is $$I_b = \frac{U}{R_b}.$$

$I_b$ is the current value of the second shunt unit 317, U is the voltage value of each of the two terminals of the second shunt unit 317, and is equal to the voltage values of the two terminals of the first shunt unit 332, and $R_b$ is a resistance value of the second shunt unit 317.

In this case, a ratio of the current value of the first shunt unit 332 to the current value of the second shunt unit 317 is $$\frac{I_a}{I_b} = \frac{U}{R_a} \times \frac{R_b}{U} = \frac{R_b}{R_a}.$$

For ease of description. "the ratio of the current value of the first shunt unit 332 to the current value of the second shunt unit 317" is referred to as a target ratio. That is, the current value of the first shunt unit 332 may be obtained based on the current value of the second shunt unit 317 and the target ratio; and the target ratio is related only to the resistance value of the first shunt unit 332 and the resistance value of the second shunt unit 317.

A first terminal of the sampling resistor Ri is connected to the second terminal of the second shunt unit 317, and a second terminal of the sampling resistor Ri is configured to connect to a ground cable GND. In this way, when the processing module 310 operates, a path from the first terminal of the second shunt unit 317 to the ground cable GND through the second shunt unit 317 and the sampling resistor Ri may be formed. That is, the second shunt unit 317 is connected in series to the sampling resistor R1, and there is no other branch on a circuit formed by connecting the second shunt unit 317 to the sampling resistor R1 in series. In this case, a current value of the sampling resistor Ri is equal to the current value of the second shunt unit 317. The current sensing unit 314 has a detection terminal i1 and an output terminal d, the detection terminal i1 of the current sensing unit 314 is connected to the sampling resistor R1, and the output terminal d of the current sensing unit 314 is connected to an input terminal e of the processing unit 312. The current sensing unit 314 is configured to perform the following steps S122 to S128 when operating.

S122: The current sensing unit 314 detects a voltage value of the sampling resistor Ri.

S124: The current sensing unit 314 determines a current value of the sampling resistor Ri based on the voltage value of the sampling resistor Ri.

The current sensing unit 314 may detect the voltage value of the sampling resistor Ri by using the detection terminal i1, and determine the current value of the sampling resistor Ri based on the voltage value of the sampling resistor Ri. In this embodiment of this application, the detection terminal i1 of the current sensing unit 314 may include a port i11 and a port i12. The port i11 is connected to the first terminal of the sampling resistor Ri, and the port i12 is connected to the second terminal of the sampling resistor Ri, so that the current sensing unit 314 can detect the voltage value of the sampling resistor Ri. A resistance value of the sampling resistor Ri may be preset in the current sensing unit 314. In this way, after detecting the voltage value of the sampling resistor Ri, the current sensing unit 314 divides the voltage value of the sampling resistor Ri by the resistance value of the sampling resistor Ri to obtain the current value of the sampling resistor Ri.

S126: The current sensing unit 314 determines the current value of the current channel Ai based on the current value of the sampling resistor Ri and the target ratio.

S128: The current sensing unit 314 sends the current value of the current channel Ai to the processing unit 312.

As described above, it is known that the current value of the sampling resistor Ri is equal to the current value of the second shunt unit 317, and the target ratio is the ratio of the current value of the first shunt unit 332 to the current value of the second shunt unit 317. Therefore, the current sensing unit 314 multiplies the current value of the sampling resistor Ri by the target ratio to obtain the current value of the first shunt unit 332, that is, obtain the current value of the current channel Ai. After obtaining the current value of the current channel Ai, the current sensing unit 314 outputs the current value of the current channel Ai to the processing unit 312.

The processing unit 312 is configured to perform the following step S222: The processing unit 312 determines power consumption of the ith load module 450 based on the current value of the current channel Ai.

As described above, the power consumption of the load module 40 may be at least one of the current value of the load module 40, the power of the load module 40, and the electrical energy used by the load module 40 within the preset duration.

In a first embodiment, the power consumption of the ith load module 450 is a current value of the ith load module 450. In this case, after obtaining the current value of the current channel Ai, the processing unit 312 may directly determine the current value of the current channel Ai as the power consumption of the ith load module 450. Details are not described again.

In a second embodiment, the power consumption of the ith load module 450 is a power of the ith load module 450. In this case, step S222 performed by the processing unit may be specifically as follows: The processing unit 312 detects an input voltage value of the current channel Ai, and determines the power consumption of the ith load module 450 based on the current value and the input voltage value of the current channel Ai.

In this embodiment, the processing unit 312 may detect the output voltage value of the energy storage module 150, that is, the input voltage value of the current channel Ai, by using an analog-to-digital converter. After obtaining the current value and the input voltage value of the current channel Ai, the processing unit 312 multiplies the current value of the current channel Ai by the input voltage value to obtain the power consumption of the ith load module 450.

Figure 12:
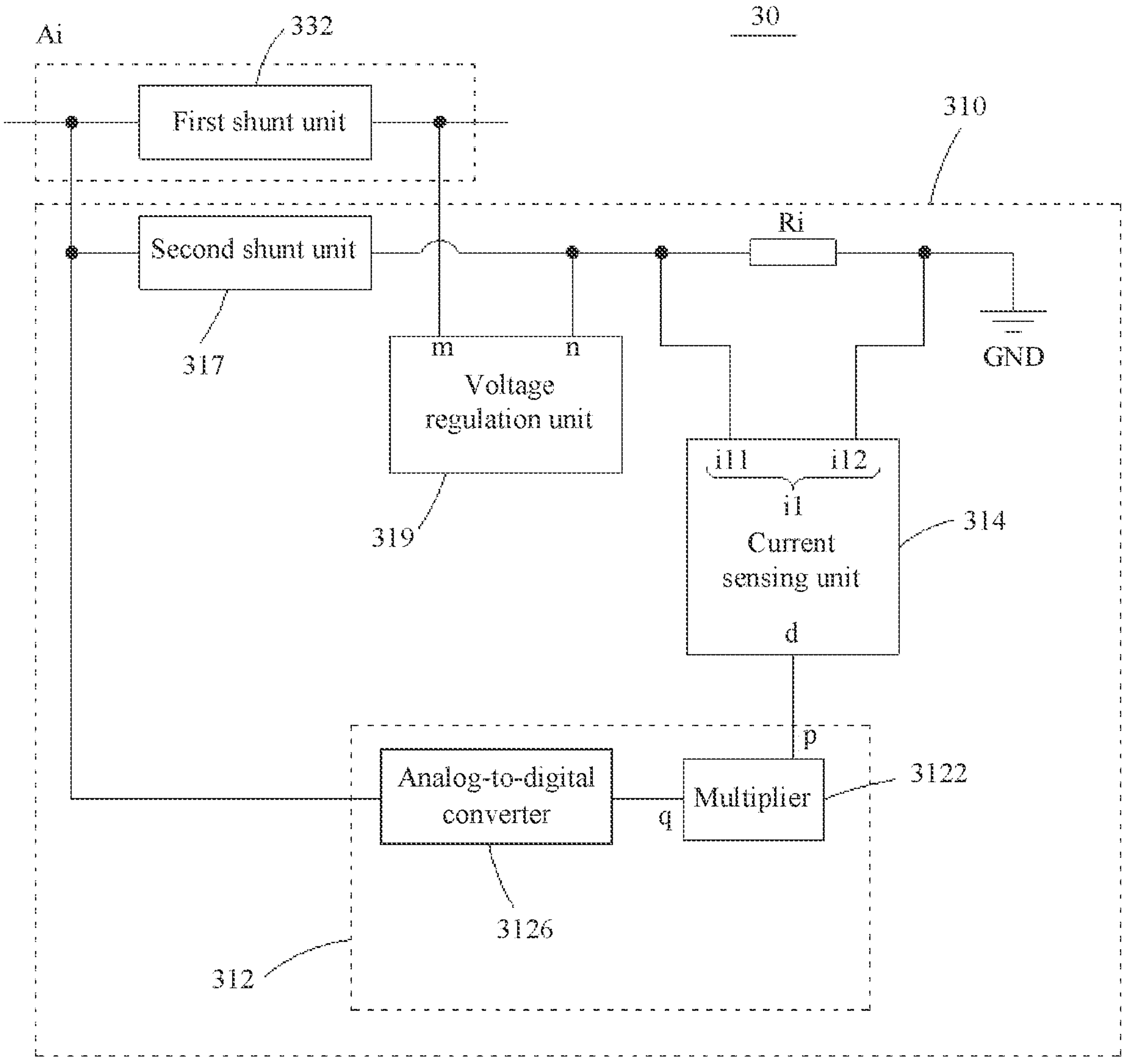
FIG. 12 is a schematic diagram of a structure of a second power consumption detection circuit according to an embodiment of this application.

This step may be implemented by the processing unit 312 by using a software algorithm, or may be implemented by using a hardware structure. When this step is implemented by using the hardware structure, a structure of the power consumption detection circuit 30 may be shown in FIG. 12. As shown in FIG. 12, the processing unit 312 includes an analog-to-digital converter 3126 and a multiplier 3122. A first input terminal p of the multiplier 3122 is connected to the output terminal d of the current sensing unit 314, and is configured to input the current value of the current channel Ai. A second input terminal q of the multiplier 3122 may detect the input voltage value of the current channel Ai by using the analog-to-digital converter 3126. The multiplier 3122 can multiply data input by the first input terminal p by data input by the second input terminal q when operating, that is, multiply the current value of the current channel Ai by the input voltage value, to obtain the power of the ith load module 450, that is, obtain the power consumption of the ith load module 450.

Figure 13:
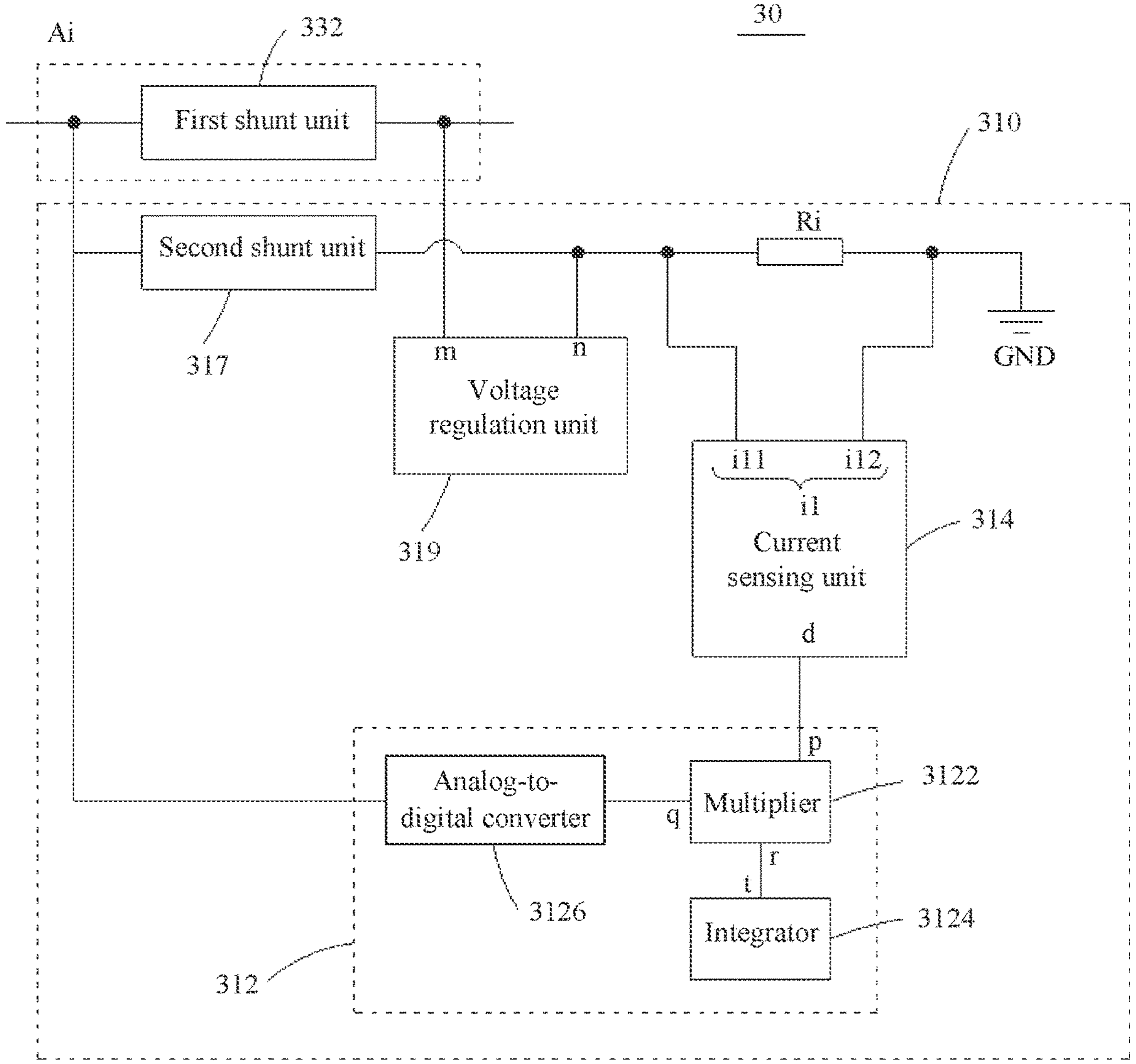
FIG. 13 is a schematic diagram of a structure of a third power consumption detection circuit according to an embodiment of this application.

In a third embodiment, the power consumption of the ith load module 450 is electrical energy used by the ith load module 450 within preset duration. Details are not described again. In this embodiment, if step S222 is implemented by using the hardware structure, a structure of the power consumption detection circuit 30 may be shown in FIG. 13.

With reference to the accompanying drawings, the following describes in detail a circuit structure and an operation principle of the power consumption detection circuit 30 in this implementation in three possible cases, and describes in detail a process of determining the target ratio by the processing unit 312 in step S126.

(1) In a first possible case, the target ratio is a fixed value.

Figure 14:
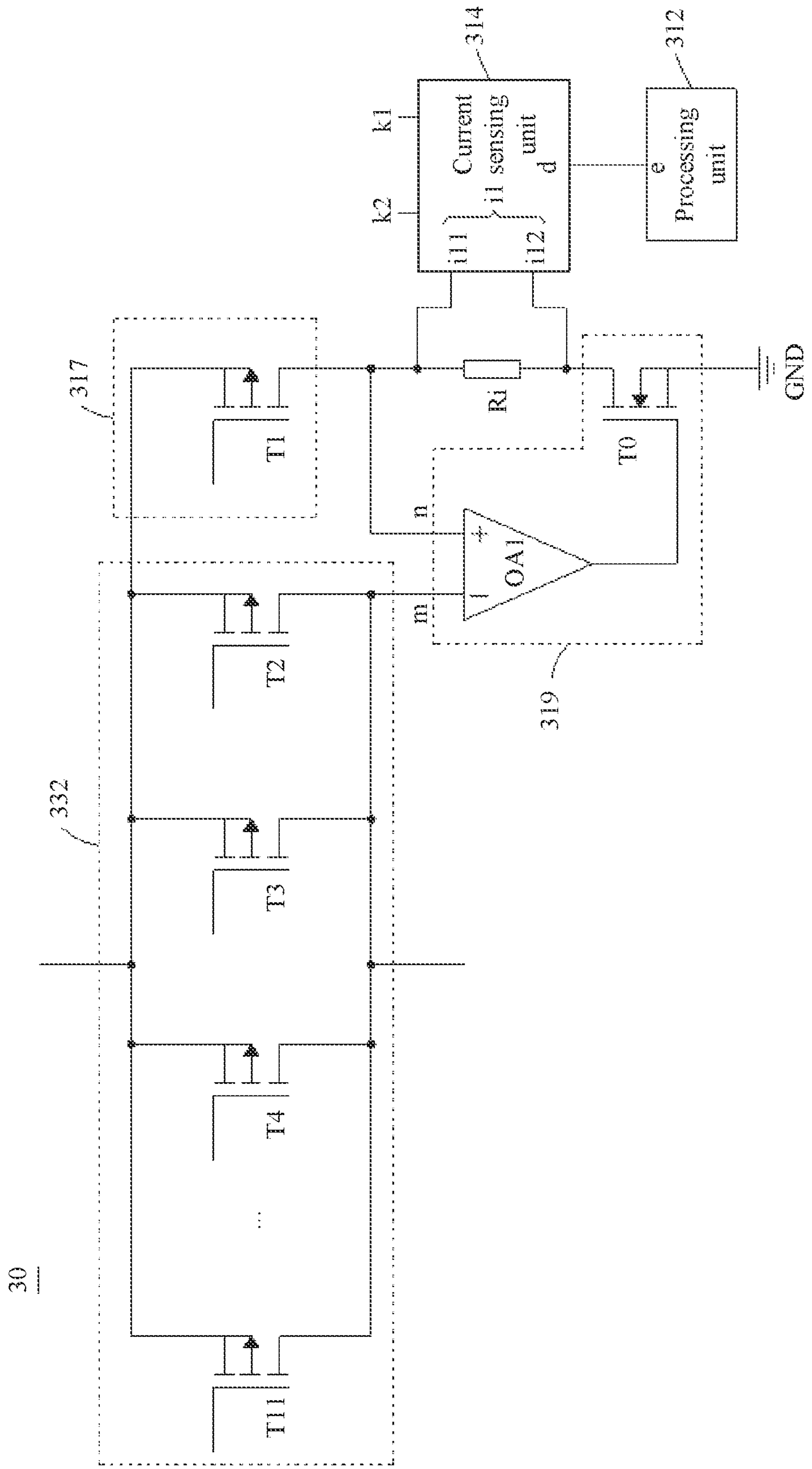
FIG. 14 is a circuit diagram of a first power consumption detection circuit according to an embodiment of this application.

FIG. 14 is a circuit diagram of a power consumption detection circuit 30 according to an embodiment of this application. As shown in FIG. 14, in some embodiments, the second shunt unit 317 includes a first transistor T1. A first electrode of the first transistor T1 is connected to the first terminal of the first shunt unit 332. That is, the first electrode of the first transistor T1 is the first terminal of the second shunt unit 317. A second electrode of the first transistor T1 is connected to the second terminal n of the voltage regulation unit 319. That is, the second electrode of the first transistor T1 is the second terminal of the second shunt unit 317.

The first shunt unit 332 includes a plurality of transistors. Herein, "a plurality of" refers to two or more. For example, the first shunt unit 332 may include two transistors, five transistors, or eight transistors. In the embodiment shown in FIG. 14, the first shunt unit 332 includes ten transistors, including a second transistor T2, a third transistor T3, a fourth transistor T4, . . . , and an eleventh transistor T11. First electrodes of the plurality of transistors in the first shunt unit 332 are all connected to the first terminal of the second shunt unit 317, and are configured to connect to the energy storage module 150. That is, the first electrodes of the plurality of transistors in the first shunt unit 332 are connected together to form the first terminal of the first shunt unit 332. Second electrodes of the plurality of transistors in the first shunt unit 332 are connected to the first terminal m of the voltage regulation unit 319, and are configured to connect to the input terminal of the ith load module 450. That is, the second electrodes of the plurality of transistors in the first shunt unit 332 are connected together to form the second terminal of the first shunt unit 332. In this possible case, the first transistor T1, the second transistor T2, the third transistor T3, the fourth transistor T4, . . . , and the eleventh transistor T11 are all P-type MOSFETs.

The voltage regulation unit 319 includes an operational amplifier OA1 and a switching transistor T0. A first input terminal of the operational amplifier OA1 is connected to the second terminal of the first shunt unit 332. That is, the first input terminal of the operational amplifier OA1 is the first terminal m of the voltage regulation unit 319. A second input terminal of the operational amplifier OA1 is connected to the second terminal of the second shunt unit 317 and the first terminal of the sampling resistor Ri. That is, the second input terminal of the operational amplifier OA1 is the second terminal n of the voltage regulation unit 319. In the embodiment shown in FIG. 14, the first input terminal of the operational amplifier OA1 is an inverting input terminal of the operational amplifier OA1, and the inverting input terminal of the operational amplifier OA1 is represented by a symbol "−". The second input terminal of the operational amplifier OA1 is a non-inverting input terminal of the operational amplifier OA1, and the non-inverting input terminal of the operational amplifier OA1 is represented by a symbol "+". An output terminal of the operational amplifier OA1 is connected to a control electrode of the switching transistor T0. The second terminal of the sampling resistor Ri is connected to a first electrode of the switching transistor T0, and a second electrode of the switching transistor T0 is configured to connect to the ground cable GND. The switching transistor T0 is an N-type MOSFET.

When the power consumption detection circuit 30 operates, a current flows out of the energy storage module 150, and flows into the ith load module 450 through a transistor in an on state in the first shunt unit 332 in the current channel Ai, to form a first current path. The current further flows out of the energy storage module 150, and flows into the ground cable GND through the second shunt unit 317, the sampling resistor Ri, and the switching transistor T0 to form a second current path.

When the voltage regulation unit 319 operates, if a voltage of the non-inverting input terminal of the operational amplifier OA1 is greater than a voltage of the inverting input terminal of the operational amplifier OA1, it indicates that a current flowing through the first transistor T1 is excessively small. In this case, the operational amplifier OA1 outputs a high-level signal, to improve an on degree of the switching transistor T0, that is, increase the current flowing through the first transistor T1. In this way, the voltage of the non-inverting input terminal of the operational amplifier OA1 can be decreased until the voltage of the non-inverting input terminal of the operational amplifier OA1 is equal to the voltage of the inverting input terminal of the operational amplifier OA1. Otherwise, when the voltage of the non-inverting input terminal of the operational amplifier OA1 is less than the voltage of the inverting input terminal of the operational amplifier OA1, it indicates that the current flowing through the first transistor T1 is excessively large. In this case, the operational amplifier OA1 outputs a low-level signal, to reduce the on degree of the switching transistor T0, that is, decrease the current flowing through the first transistor T1. In this way, the voltage of the non-inverting input terminal of the operational amplifier OA1 can be increased until the voltage of the non-inverting input terminal of the operational amplifier OA1 is equal to the voltage of the inverting input terminal of the operational amplifier OA1.

In this embodiment, the current sensing unit 314 further has an output terminal k1 and an output terminal k2. The output terminal k1 of the current sensing unit 314 is connected to a control electrode of the first transistor T1 (a connection relationship is not shown in the figure). When the processing module 310 operates, the output terminal k1 of the current sensing unit 314 may output a level signal, to control the first transistor T1 in the second shunt unit 317 to be turned on. The output terminal k2 of the current sensing unit 314 is connected to a control electrode of each of the plurality of transistors in the first shunt unit 332 (a connection relationship is not shown in the figure). When the processing module 310 operates, the output terminal k2 of the current sensing unit 314 may output a level signal, to control all the transistors in the first shunt unit 332 to be turned on.

It can be learned from the foregoing description that, when the processing module 310 operates, the target ratio is $$K = \frac{R_b}{R_a}.$$

A resistance between a first electrode and a second electrode of any transistor is $$R_T = \frac{1}{\mu Cox\left(\frac{W}{L}\right)(V_{GS} - V_{TH})}.$$

$R_T$ is the resistance between the first electrode and the second electrode of the transistor, μ is carrier mobility of a channel of the transistor, Cox is a gate capacitance per unit area of the transistor, W is a channel width of the transistor, L is a channel length of the transistor, $V_{GS}$ is a voltage difference between the control electrode and the first electrode of the transistor, and $V_{TH}$ is agate threshold voltage of the transistor. In this embodiment of this application, all the transistors in the first shunt unit 332 and the second shunt unit 317 may be formed on a same silicon chip, so that carrier mobility and gate threshold voltages of the transistors in the first shunt unit 332 and the second shunt unit 317 are basically the same. In this case, gate capacitances per unit area of all the transistors in the first shunt unit 332 and the second shunt unit 317 are controlled to be the same. When the processing module 310 operates, voltage differences between the control electrodes and the first electrodes of all the transistors in the first shunt unit 332 and the second shunt unit 317 are the same, so that the target ratio is related only to ratios of channel widths to channel lengths of the transistors.

It can be learned with reference to $$K = \frac{R_b}{R_a} \text{ and } R_T = \frac{1}{\mu Cox\left(\frac{W}{L}\right)(V_{GS} - V_{TH})}$$

that, in the embodiment shown in FIG. 14, when the ratios of the channel widths to the channel lengths of all the transistors in the first shunt unit 332 and the second shunt unit 317 are the same, the target ratio is 10. In this embodiment, because the target ratio is a fixed value, the target ratio may be pre-stored in the current sensing unit 314, so that the current sensing unit 314 invokes the target ratio when step S126 is performed.

In this possible case, in some embodiments that are not shown, the second shunt unit 317 may alternatively include a plurality of parallel transistors. When the processing module 310 operates, the plurality of transistors in the second shunt unit 317 are all turned on. Details are not described again.

(2) In a second possible case, the target ratio is a non-fixed value.

Figure 15:
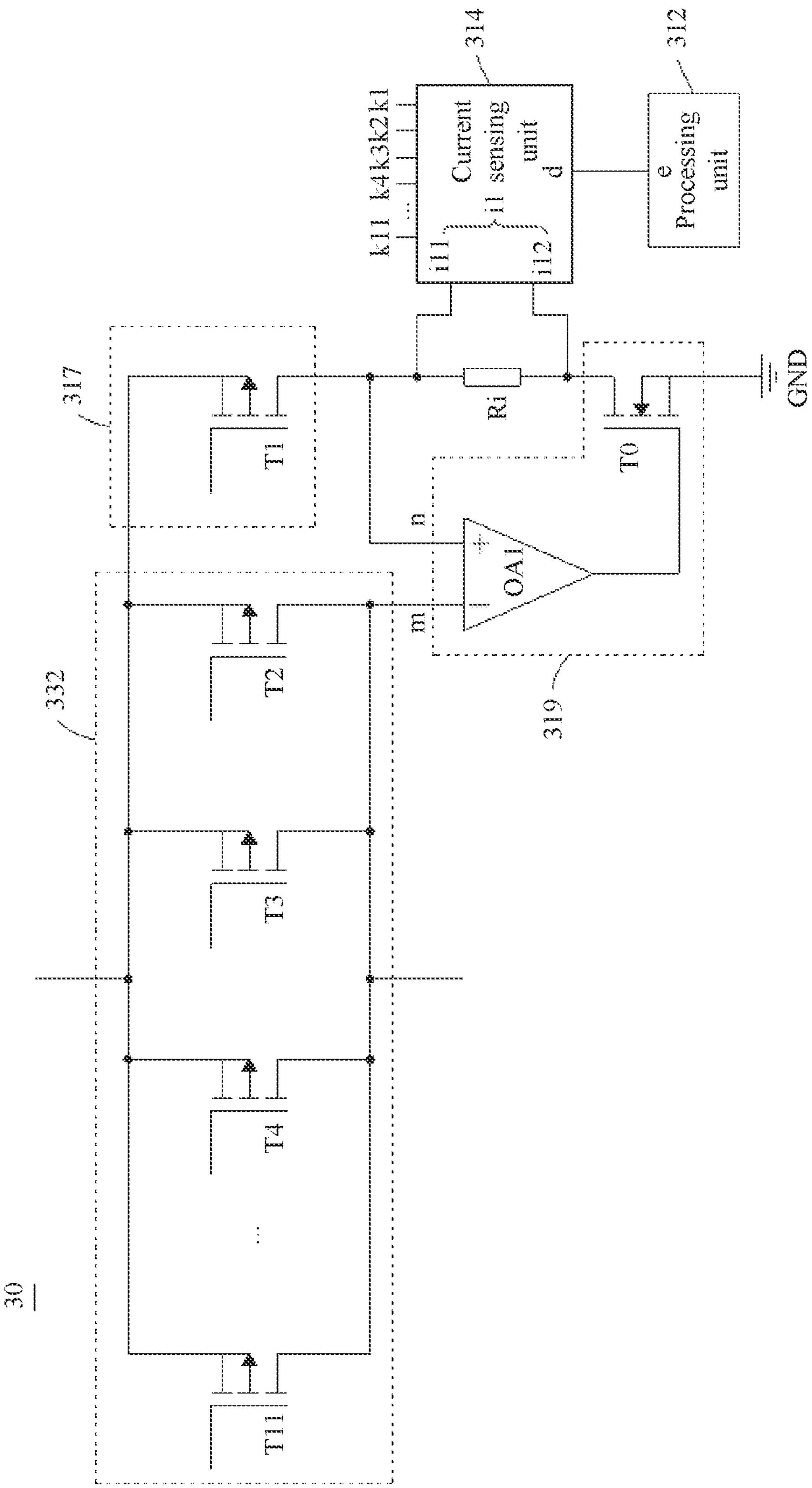
FIG. 15 is a circuit diagram of a second power consumption detection circuit according to an embodiment of this application.

FIG. 15 is a circuit diagram of another power consumption detection circuit 30 according to an embodiment of this application. In the embodiment shown in FIG. 15, structures of the first shunt unit 332, the second shunt unit 317, and the voltage regulation unit 319 are the same as those in the embodiment shown in FIG. 14, and are not described again.

Different from the embodiment shown in FIG. 14, in the embodiment shown in FIG. 15, the current sensing unit 314 has a plurality of output terminals. A quantity of output terminals of the current sensing unit 314 is equal to a total quantity of transistors in the first shunt unit 332 and the second shunt unit 317. Specifically, the current sensing unit 314 has an output terminal k1, an output terminal k2, an output terminal k3, an output terminal k4, . . . , and an output terminal k11. The output terminal k1 of the current sensing unit 314 is connected to the control electrode of the first transistor T1 (a connection relationship is not shown in the figure), the output terminal k2 of the current sensing unit 314 is connected to the control electrode of the second transistor T2, the output terminal k3 of the current sensing unit 314 is connected to the control electrode of the third transistor T3, the output terminal k4 of the current sensing unit 314 is connected to the control electrode of the fourth transistor T4, . . . , and the output terminal k11 of the current sensing unit 314 is connected to the control electrode of the eleventh transistor T11. In this way, the current sensing unit 314 can control on and off of each of the plurality of transistors in the first shunt unit 332. When the current sensing unit 314 operates, the output terminal k1 of the current sensing unit 314 may output a level signal, to control the first transistor T1 in the second shunt unit 317 to be turned on. At least one of the output terminal k2, the output terminal k3, the output terminal k4, . . . , and the output terminal k11 of the current sensing unit 314 outputs a level signal, to control at least one of the second transistor T2, the third transistor T3, the fourth transistor T4, . . . , and the eleventh transistor T1 in the first shunt unit 332 to be turned on.

In this embodiment, when the current sensing unit 314 operates, the target ratio may be determined based on a quantity of transistors in an on state in the first shunt unit 332. For example, the ratios of the channel widths to the channel lengths of all the transistors in the first shunt unit 332 and the second shunt unit 317 are still the same. Then, when two transistors in the first shunt unit 332 are turned on, the target ratio is 2; when three transistors in the first shunt unit 332 are turned on, the target ratio is 3; . . . ; and when ten transistors in the first shunt unit 332 are turned on, the target ratio is 10.

In this embodiment, when operating, the current sensing unit 314 is further configured to adjust, based on a voltage of the sampling resistor Ri, the quantity of transistors in the on state in the plurality of transistors in the first shunt unit 332. The target ratio may be adjusted by adjusting the quantity of transistors in the on state in the plurality of transistors in the first shunt unit 332.

The current sensing unit 314 may adjust the quantity of transistors in the on state in the plurality of transistors in the first shunt unit 332, that is, adjust the target ratio, to keep the voltage of the sampling resistor Ri within a preset voltage range. Specifically, the preset voltage range may be preset in the current sensing unit 314, and the preset voltage range is a target voltage range of the sampling resistor Ri. That is, when the processing module 310 operates, the voltage of the sampling resistor Ri needs to be controlled within the preset voltage range. When operating, the current sensing unit 314 is configured to: When the current sensing unit 314 detects that the voltage of the sampling resistor Ri is large, it indicates that a current flowing through the sampling resistor Ri is large, that is, a current flowing through the first shunt unit 332 is large. In this case, when the current flowing through the first shunt unit 332 remains unchanged, the current sensing unit 314 may increase the target ratio by increasing the quantity of transistors in the on state in the first shunt unit 332, to decrease the current flowing through the sampling resistor Ri, that is, decrease the voltage of the sampling resistor Ri, so that the voltage of the sampling resistor Ri is kept within the preset voltage range. In this way, current detection precision can be ensured, and an electrical energy loss caused by the sampling resistor Ri can be reduced. Similarly, when the voltage of the sampling resistor Ri that is detected by the current sensing unit 314 is small, it indicates that the current flowing through the sampling resistor Ri is small, that is, the current flowing through the first shunt unit 332 is small. In this case, when the current flowing through the first shunt unit 332 remains unchanged, the current sensing unit 314 may decrease the target ratio by reducing the quantity of transistors in the on state in the first shunt unit 332, to increase the current flowing through the sampling resistor Ri, that is, increase the voltage of the sampling resistor Ri, so that the voltage of the sampling resistor Ri is kept within the preset voltage range. In this way, the current detection precision can be ensured.

In this possible case, in some embodiments that are not shown, ratios of channel widths to channel lengths of at least two of the plurality of transistors in the first shunt unit 332 may alternatively be different.

(3) In a third possible case, the target ratio is a non-fixed value.

Figure 16:
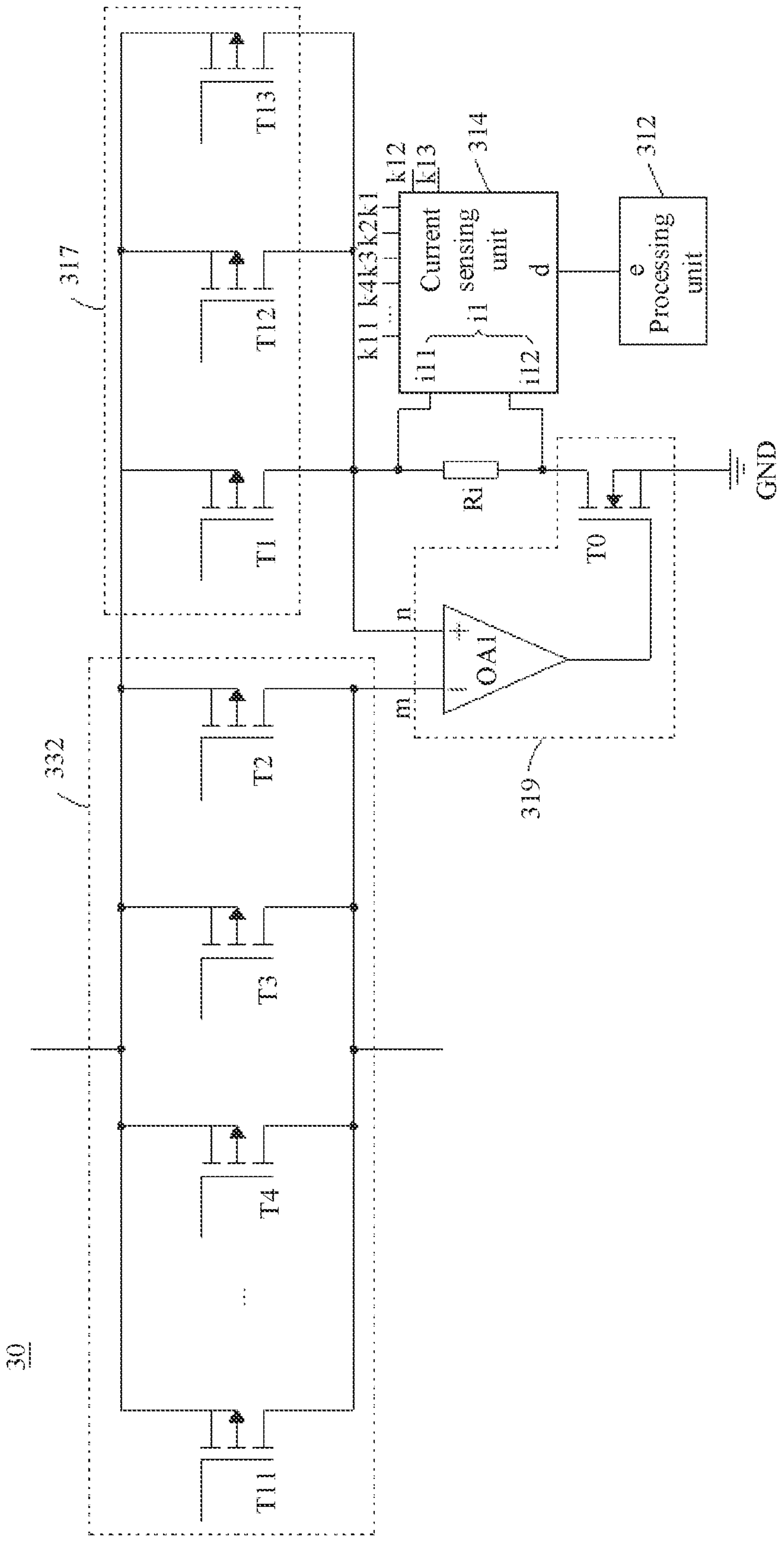
FIG. 16 is a circuit diagram of a third power consumption detection circuit according to an embodiment of this application.

FIG. 16 is a circuit diagram of still another power consumption detection circuit 30 according to an embodiment of this application. Different from the embodiment shown in FIG. 15, in the embodiment shown in FIG. 16, in addition to the first transistor T1, the second shunt unit 317 further includes a twelfth transistor T12 and a thirteenth transistor T13. First electrodes of the first transistor T1, the twelfth transistor T12, and the thirteenth transistor T13 are connected together to form the first terminal of the second shunt unit 317. Second electrodes of the first transistor T1, the twelfth transistor T12, and the thirteenth transistor T13 are connected together to form the second terminal of the second shunt unit 317. The current sensing unit 314 further has output terminals k12 and k13. The output terminal k12 of the current sensing unit 314 is connected to a control electrode of the twelfth transistor T12, and the output terminal k13 of the current sensing unit 314 is connected to a control electrode of the thirteenth transistor T13. In this embodiment, the current sensing unit 314 is configured to adjust the target ratio by adjusting a quantity of transistors in an on state in the plurality of transistors in the first shunt unit 332 or/and adjusting a quantity of transistors in an on state in the plurality of transistors in the second shunt unit 317. In this way, an adjustment range of the target ratio may be enlarged.

In this embodiment, when operating, the current sensing unit 314 is further configured to determine the target ratio based on the quantity of transistors in the on state in the first shunt unit 332 and the quantity of transistors in the on state in the second shunt unit 317.

Figure 17:
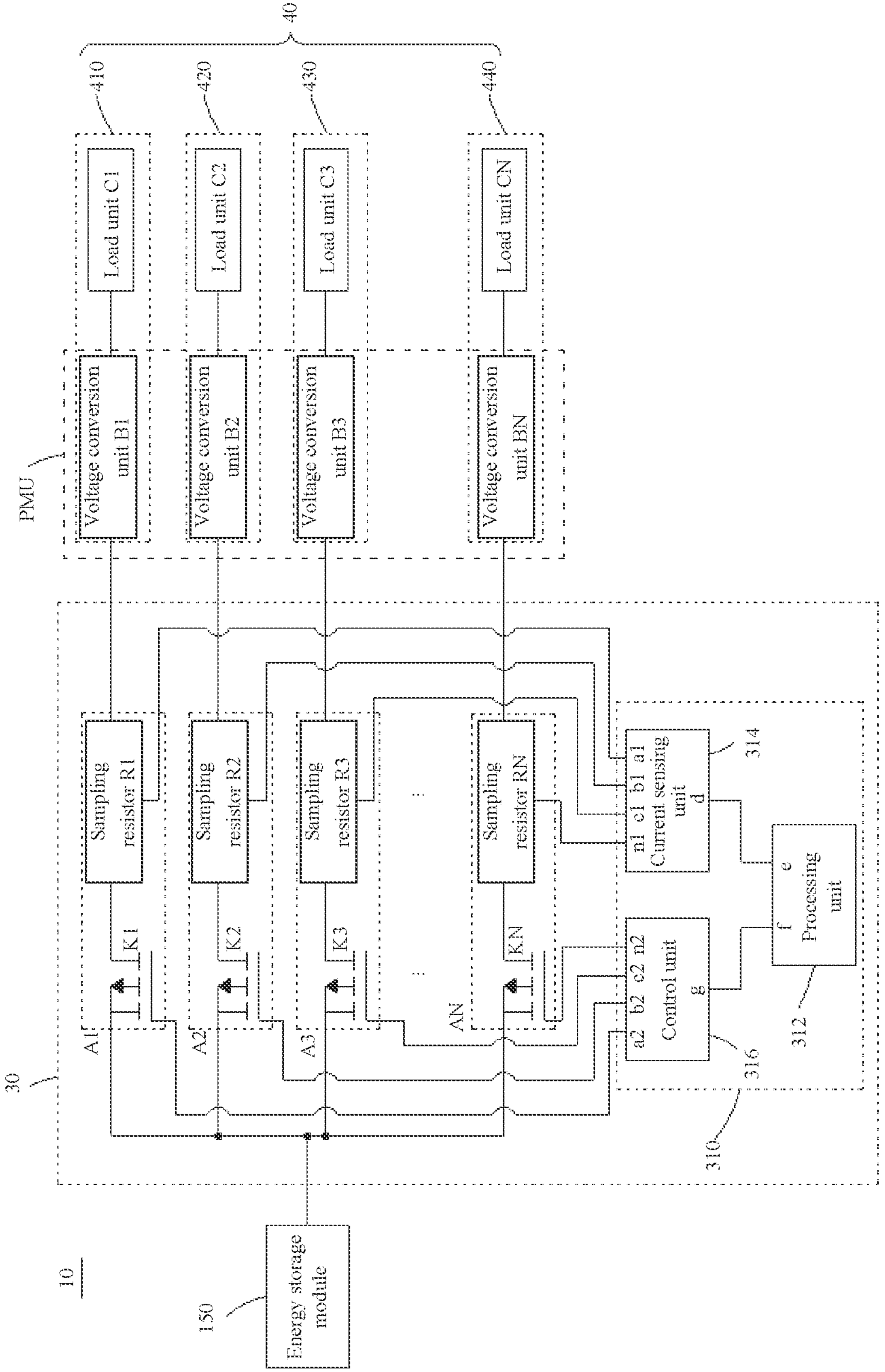
FIG. 17 is a schematic diagram of an internal structure of a sixth terminal device according to an embodiment of this application.
Figure 18:
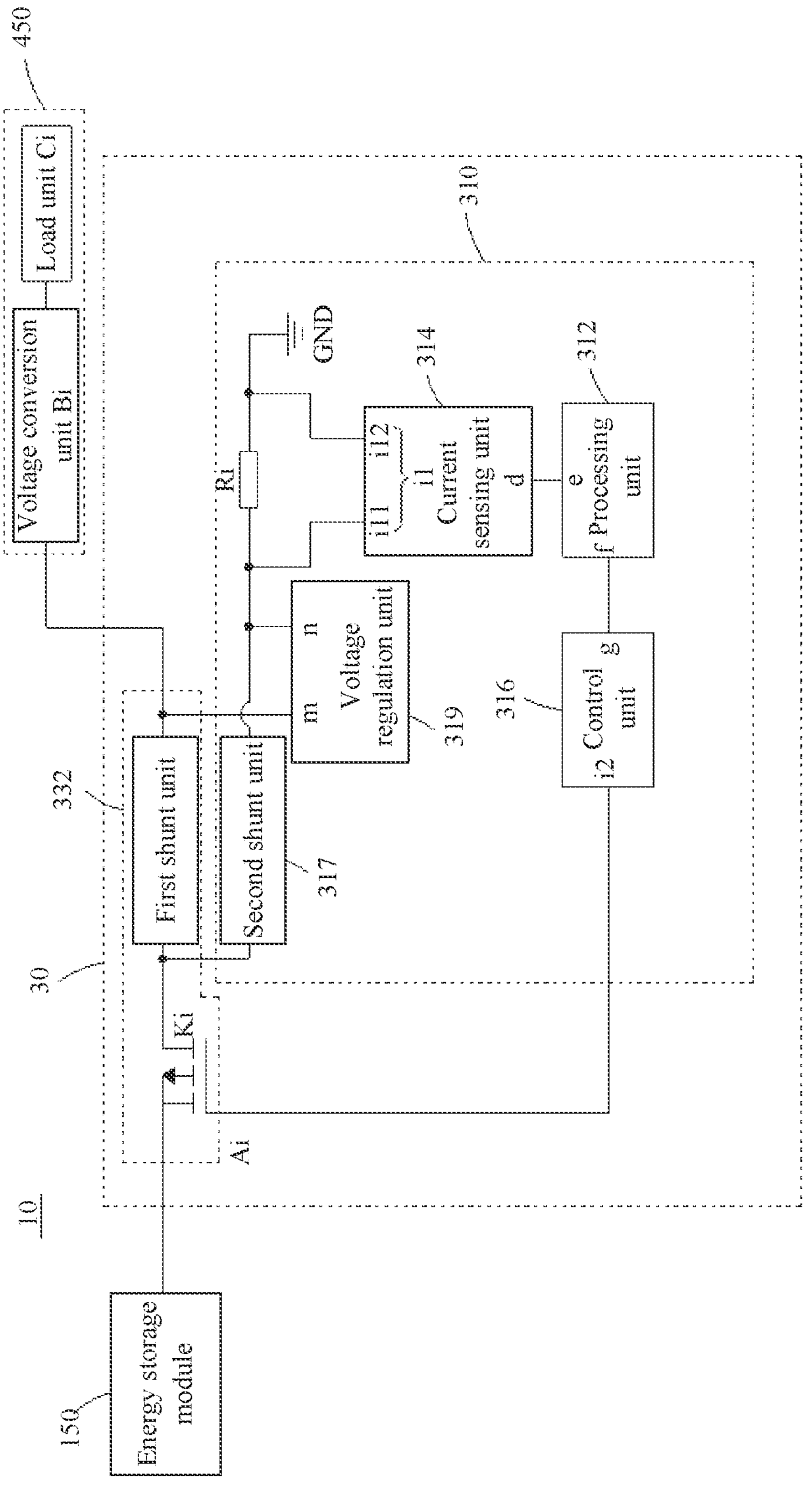
FIG. 18 is a schematic diagram of an internal structure of a seventh terminal device according to an embodiment of this application.

FIG. 17 and FIG. 18 are schematic diagrams of internal structures of two different terminal devices 10 according to embodiments of this application. As shown in FIG. 17 and FIG. 18, in some embodiments, any current channel further includes a switching component. The switching component is connected in series to another component in the current channel.

Specifically, based on the structure shown in FIG. 7, the switching component is added to each current channel in the terminal device 10 shown in FIG. 17. As shown in FIG. 17, when any current channel includes a sampling resistor and a switching component, the sampling resistor and the switching component in the current channel are connected in series. The current channel A1 is used as an example. The current channel A1 may include a sampling resistor Ri and a switching component K1. The switching component K1 herein is a three-terminal switching component. The switching component K1 has a first terminal, a second terminal, and a control terminal. The first terminal of the switching component K1 is connected to the energy storage module 150, and the second terminal of the switching component K1 is connected to a first terminal of the sampling resistor Ri. That is, the first terminal of the sampling resistor Ri is connected to the energy storage module 150 by using the switching component K1. The control terminal of the switching component K1 is connected to the processing module 310, so that the processing module 310 can control on and off of the switching component K1. In this way, when the processing module 310 controls the switching component K1 to be turned on, the energy storage module 150 may supply power to the first load module 410 through the current channel A1. When the processing module 310 controls the switching component K1 to be turned off, the energy storage module 150 cannot supply power to the first load module 410. Similarly, the current channel A2 may also include a sampling resistor R2 and a switching component K2 that are connected in series; the current channel A3 may also include a sampling resistor R3 and a switching component K3 that are connected in series; . . . ; and the current channel AN may also include a sampling resistor RN and a switching component KN that are connected in series. The processing module 310 may separately control on and off of any one of the switching component K1, the switching component K2, the switching component K3, . . . , and the switching component KN.

In some specific embodiments, the switching component may be a metal oxide semiconductor field effect transistor (metal oxide semiconductor field effect transistor, MOSFET), for example, the switching component may be a P-type MOSFET. In this case, the first terminal of the switching component is a source of the P-type MOSFET, the second terminal of the switching component is a drain of the P-type MOSFET, and the control terminal of the switching component is a gate of the P-type MOSFET.

In this embodiment, the processing module 310 is further configured to perform the following steps S310 and S320 when operating.

S310: If the processing module 310 receives a first instruction, the processing module 310 controls the switching component to be turned on.

S320: If the processing module 310 receives a second instruction, the processing module 310 controls the switching component to be turned off.

Step S310 and step S320 are not in sequence. The first instruction is used to instruct the terminal device 10 to be powered on or instruct the load module 40 corresponding to the current channel to operate. To be specific, in a first possible case, when the processing module 310 receives an instruction of "the terminal device 10 is powered on", the processing module 310 may control the switching component in each current channel to be turned on. In this case, the energy storage module 150 supplies power to all the load modules 40. In a second possible case, when the processing module 310 receives an instruction of "the load module 40 corresponding to the current channel operates", the processing module 310 may control the switching component in the current channel to be turned on. In this case, the energy storage module 150 supplies power to the load module 40 that needs to operate. For example, when receiving an instruction of "the first load module 410 operates", the processing module 310 controls the switching component K1 to be turned on, so that the energy storage module 150 supplies power to the first load module 410 through the current channel A1, and the processing module 310 can detect the power consumption of the first load module 410. When receiving an instruction of "the Nth load module 440 operates", the processing module 310 controls the switching component KN to be turned on, so that the energy storage module 150 supplies power to the Nth load module 440 through the current channel AN, and the processing module 310 can detect the power consumption of the Nth load module 440.

The second instruction is used to instruct the terminal device 10 to be powered off or instruct the load module 40 corresponding to the current channel to stop operating. To be specific, in a first possible case, when the processing module 310 receives an instruction of "the terminal device 10 is powered off", the processing module 310 may control the switching component in each current channel to be turned off. In this case, the energy storage module 150 cannot supply power to all the load modules 40. In a second possible case, when the processing module 310 receives an instruction of "the load module 40 corresponding to the current channel stops operating", the processing module 310 may control the switching component in the current channel to be turned off. In this case, the energy storage module 150 no longer supplies power to the load module 40 that stops operating. For example, when receiving an instruction of "the first load module 410 stops operating", the processing module 310 controls the switching component K1 to be turned off, so that the energy storage module 150 no longer supplies power to the first load module 410 through the current channel A1. When receiving an instruction of "the Nth load module 440 stops operating", the processing module 310 controls the switching component KN to be turned off, so that the energy storage module 150 no longer supplies power to the Nth load module 440 through the current channel AN.

In some embodiments, as shown in FIG. 17, to perform the foregoing steps S310 and S320, the processing module 310 further includes a control unit 316 connected to the processing unit 312. The processing unit 312 has an output terminal f. The control unit 316 has an input terminal g and an output terminal. The output terminal f of the processing unit 312 is connected to the input terminal g of the control unit 316, and the output terminal of the control unit 316 is connected to the control terminal of the switching component in each current channel.

In this embodiment, the control unit 316 may have a plurality of output terminals. For example, in the embodiment shown in FIG. 17, the output terminals of the control unit 316 include an output terminal a2, an output terminal b2, an output terminal c2, and an output terminal n2. For example, the switching component K1, the switching component K2, the switching component K3, . . . , and the switching component KN are all P-type MOSFETs. When the processing module 310 operates, in a first possible case, the processing unit 312 receives the instruction of "the terminal device 10 is powered on". In this case, the processing unit 312 may output a first signal to the control unit 316. When receiving the first signal, the control unit 316 outputs a low-level signal from each of the output terminal a2, the output terminal b2, the output terminal c2, and the output terminal n2, to control the switching component K1, the switching component K2, the switching component K3, and the switching component KN to be turned on, so that the energy storage module 150 supplies power to all the load modules 40. In a second possible case, the processing unit 312 receives the instruction of "the first load module 410 (corresponding to the current channel A1) operates". In this case, the processing unit 312 may output a second signal to the control unit 316. When receiving the second signal, the control unit 316 outputs a low-level signal from the output terminal a2, to control the switching component K1 to be turned on, so that the energy storage module 150 supplies power to the first load module 410 through the current channel A1. In a third possible case, the processing unit 312 receives the instruction of "the terminal device 10 is powered off". In this case, the processing unit 312 may output a third signal to the control unit 316. When receiving the third signal, the control unit 316 outputs a high-level signal from each of the output terminal a2, the output terminal b2, the output terminal c2, and the output terminal n2, to control the switching component K1, the switching component K2, the switching component K3, and the switching component KN to be turned off, so that the energy storage module 150 cannot supply power to all the load modules 40. In a fourth possible case, the processing unit 312 receives the instruction of "the first load module 410 (corresponding to the current channel A1) stops operating". In this case, the processing unit 312 may output a fourth signal to the control unit 316. When receiving the fourth signal, the control unit 316 outputs a high-level signal from the output terminal a2, to control the switching component K1 to be turned off, so that the energy storage module 150 no longer supplies power to the first load module 410 through the current channel A1.

In some specific embodiments, when receiving the instruction of "the terminal device 10 is powered off", the processing unit 312 may further control the current sensing unit 314 and the control unit 316 to stop operating. In this case, only a circuit (that is, a power-on trigger circuit) that is in the processing unit 312 and that is configured to receive the instruction of "the terminal device 10 is powered on" operates. That is, when the processing unit 312 receives the instruction of "the terminal device 10 is powered off", only a power-on trigger function is retained, and another function stops operating. In this way, electrical energy can be saved to the greatest extent.

Based on the structure shown in FIG. 11, the switching component is added to each current channel in the power consumption detection circuit 30 in the terminal device 10 shown in FIG. 18. As shown in FIG. 18, when the current channel Ai includes a first shunt unit 332 and a switching component K1, the first shunt unit 332 and the switching component K1 in the current channel Ai are connected in series. Similarly, the switching component K1 is a three-terminal switching component. The switching component K1 has a first terminal, a second terminal, and a control terminal. The first terminal of the switching component K1 is connected to the energy storage module 150, and the second terminal of the switching component K1 is connected to a first terminal of the first shunt unit 332. That is, the first terminal of the first shunt unit 332 is connected to the energy storage module 150 by using the switching component K1. The control terminal of the switching component K1 is connected to the processing module 310, so that the processing module 310 can control on and off of the switching component K1. In this way, when the processing module 310 controls both the switching component K1 and the first shunt unit 332 to be turned on, the energy storage module 150 may supply power to the ith load module 450 through the current channel Ai. When the processing module 310 controls the switching component K1 to be turned off, the energy storage module 150 cannot supply power to the ith load module 450. The switching component K1 may also be a P-type MOSFET. Details are not described again.

In this embodiment, the processing module 310 is also configured to perform the foregoing steps S310 and S320 when operating. In this case, step S310 is specifically as follows: When the processing module 310 receives an instruction of "the terminal device 10 is powered on" or an instruction of "the ith load module 450 operates", the processing module 310 controls the switching component K1 to be turned on. Step S320 is specifically as follows: When the processing module 310 receives an instruction of "the terminal device 10 is powered off" or an instruction of "the ith load module 450 stops operating", the processing module 310 controls the switching component K1 to be turned off.

In some embodiments, as shown in FIG. 18, to perform the foregoing steps S310 and S320, the processing module 310 further includes a control unit 316 connected to the processing unit 312. The processing unit 312 has an output terminal f. The control unit 316 has an input terminal g and an output terminal i2. The output terminal i2 of the control unit 316 is connected to the control terminal of the switching component K1 in the current channel Ai. For example, the switching component K1 is a P-type MOSFET. When the processing module 310 operates, in a first possible case, the processing unit 312 receives the instruction of "the terminal device 10 is powered on" or the instruction of "the ith load module 450 starts to operate". In this case, the processing unit 312 may output a fifth signal to the control unit 316. When receiving the fifth signal, the control unit 316 outputs a low-level signal from the output terminal i2, to control the switching component K1 to be turned on. In addition, the current sensing unit 314 controls the first shunt unit 332 and the second shunt unit 317 to be turned on, so that the energy storage module 150 supplies power to the ith load module 450. In a second possible case, the processing unit 312 receives the instruction of "the terminal device 10 is powered off" or the instruction of "the ith load module 450 stops operating". In this case, the processing unit 312 may output a sixth signal to the control unit 316. When receiving the sixth signal, the control unit 316 outputs a high-level signal from the output terminal i2, to control the switching component K1 to be turned off. In addition, the current sensing unit 314 controls the first shunt unit 332 and the second shunt unit 317 to be turned off, so that the energy storage module 150 no longer supplies power to the ith load module 450 through the current channel Ai.

In this embodiment, the processing unit 312 may further output a signal to the current sensing unit 314. For example, the input terminal e of the processing unit 312 further has a signal output function, and the output terminal d of the current sensing unit 314 further has a signal input function. The processing unit 312 further outputs a seventh signal to the current sensing unit 314 while outputting the fifth signal to the control unit 316. The current sensing unit 314 starts to operate when receiving the seventh signal, to control the first shunt unit 332 and the second shunt unit 317 to be turned on. The processing unit 312 further outputs an eighth signal to the current sensing unit 314 while outputting the sixth signal to the control unit 316. When receiving the eighth signal, the current sensing unit 314 controls the first shunt unit 332 and the second shunt unit 317 to be turned off.

It may be understood that, in the terminal device 10 shown in FIG. 18, when a circuit structure of the power consumption detection circuit 30 is shown in FIG. 14, FIG. 15, or FIG. 16, and when the processing unit 312 may further output the signal to the current sensing unit 314, on-off control of the current channel Ai can still be implemented even if no switching component K1 is disposed in the current channel Ai. Specifically, in a first possible case, the processing unit 312 receives the instruction of "the terminal device 10 is powered on" or the instruction of "the ith load module 450 starts to operate". In this case, the processing unit 312 may output the seventh signal to the current sensing unit 314. When receiving the seventh signal, the current sensing unit 314 controls the first shunt unit 332 and the second shunt unit 317 to be turned on. In a second possible case, the processing unit 312 receives the instruction of "the terminal device 10 is powered off" or the instruction of "the ith load module 450 stops operating". In this case, the processing unit 312 may output the eighth signal to the current sensing unit 314. When receiving the eighth signal, the current sensing unit 314 controls the first shunt unit 332 and the second shunt unit 317 to be turned off.

The power consumption detection circuit 30 provided in this embodiment of this application has at least the following beneficial effects: (1) The power consumption detection circuit 30 may be applied to the terminal device 10, to detect the power consumption of each load module 40 in the terminal device 10. Based on this, the standby capability of the terminal device 10 can be detected in real time. (2) When the power consumption detection circuit 30 is applied to the terminal device 10, the power consumption of each load module 40, that is, the total power consumption of the voltage conversion unit and the load unit, is detected. When the load unit operates, the voltage conversion unit connected to the load unit also needs to operate. Therefore, compared with detecting only the power consumption of the load unit, more realistic and accurate power consumption data can be obtained by detecting the total power consumption of the voltage conversion unit and the load unit, thereby more precisely detecting the standby capability of the terminal device 10. (3) The processing module 310 is integrated in the power consumption detection circuit 30, so that the power consumption detection circuit 30 operates without relying on the system on chip in the terminal device 10. In this way, when the terminal device 10 is in the power-off state, the power consumption detection circuit 30 may also run independently. (4) When the power consumption detection circuit 30 operates, the processing module 310 may simultaneously detect the current value of each of the plurality of current channels, to obtain the power consumption of the load module 40 corresponding to each current channel. In this way, it can be ensured that the sum of the plurality of current values detected by the processing module 310 is equal to the value of the total current that is output by the energy storage module 150 to the load modules 40, thereby more precisely detecting the standby capability of the terminal device 10. (5) The current channel in the power consumption detection circuit 30 is connected between the energy storage module 150 and the input terminal of the voltage conversion unit, so that there is a fewer electrical energy loss. (6) When the processing unit 312 receives the instruction of "the terminal device 10 is powered off", only the power-on trigger function is retained, and the another function stops operating. In this way, electrical energy can be saved to the greatest extent. (7) The energy storage module 150 separately supplies power to the processing module 310 in the power consumption detection circuit 30, and the power consumption of the power consumption detection circuit 30 is not included in the power consumption of the load module 40 that is detected by the processing module 310. In this way, more realistic and accurate power consumption data of the load modules 40 during operation of the terminal device 10 can be obtained, thereby more precisely detecting the standby capability of the terminal device 10. (8) When the target ratio of the first shunt unit 332 to the second shunt unit 317 is greater than 1, the current value of the second shunt unit 317 is less than the current value of the first shunt unit 332. In this case, compared with directly detecting the current value of the first shunt unit 332, the loss caused by the sampling resistor can be reduced by detecting the current value of the second shunt unit 317 and calculating the current value of the first shunt unit 332 based on the current value of the second shunt unit 317. In addition, when the target ratio of the first shunt unit 332 to the second shunt unit 317 is adjustable, the current detection precision can be further ensured. (9) An operational process of the processing module 310 may be implemented by using a hardware structure. Compared with implementing the operational process by using a software algorithm, electrical energy can be saved, and power consumption caused by the power consumption detection circuit 30 can be reduced. (10) The processing module 310 may be triggered by the third instruction to start operating, and triggered by the fourth instruction to stop operating, thereby avoiding electrical energy waste caused by continuous operation of the processing module 310. (11) In one load module 40, one voltage conversion unit may be connected to a plurality of load units. In this way, the quantity of current channels can be reduced, thereby achieving the objective of saving costs.

An embodiment of this application further provides a power consumption detection chip, including the power consumption detection circuit 30 in any one of the foregoing embodiments. The power consumption detection chip may be a chip that encapsulates the power consumption detection circuit 30 in any one of the foregoing embodiments. The power consumption detection chip has beneficial effects of a small size, low costs, high precision, and the like.

Specifically, the power consumption detection circuit 30 is applied to a terminal device 10. The terminal device 10 includes an energy storage module 150 and a plurality of load modules 40. Each load module 40 includes a voltage conversion unit and a load unit that are connected in series. In each load module 40, the voltage conversion unit is connected between the energy storage module 150 and the load unit, so that electrical energy output by the energy storage module 150 to the load module 40 is output to the load unit through the voltage conversion unit.

The power consumption detection circuit 30 includes a plurality of current channels and a processing module 310. A quantity of current channels is equal to a quantity of load modules 40 in the terminal device 10, and the plurality of current channels are in a one-to-one correspondence with the plurality of load modules 40. Input terminals of the plurality of current channels are configured to connect to the energy storage module 150, and an output terminal of each of the plurality of current channels is configured to connect to an input terminal of a corresponding load module 40. That is, the energy storage module 150 supplies power to the corresponding load module 40 through the current channel.

A detection terminal of the processing module 310 is connected to each current channel. The processing module 310 is configured to detect a current value of each of the plurality of current channels, and determine power consumption of the corresponding load module 40 based on the current value of each current channel.

In some embodiments, the processing module 310 is configured to: detect the current value of each current channel if a third instruction is received, and determine the power consumption of the corresponding load module 40 based on the current value of each current channel; or stop detecting the current value of each current channel if a fourth instruction is received. The third instruction is used to instruct the processing module 310 to start detecting the power consumption of the load module 40 corresponding to each current channel. The fourth instruction is used to instruct the processing module 310 to stop detecting the power consumption of the load module 40 corresponding to each current channel. That is, in this embodiment, the processing module 310 detects the current value of each current channel only after receiving the third instruction, and determines the power consumption of the corresponding load module 40 based on the current value of each current channel. The processing module 310 stops detecting the current value of each current channel after receiving the fourth instruction. In this case, the processing module 310 no longer detects the power consumption of the load module 40 corresponding to each current channel.

In some embodiments, a load module 40 corresponding to any one of the plurality of current channels includes one voltage conversion unit and a plurality of load units. An output terminal of the current channel is configured to connect to an input terminal of the voltage conversion unit, and an output terminal of the voltage conversion unit is connected to the plurality of load units. The processing module 310 is further configured to: when the plurality of load units operate simultaneously, determine power consumption of one of the plurality of load units based on a current value of the current channel and a preset ratio. The preset ratio is a ratio of the power consumption of the load unit to power consumption of the load module 40 corresponding to the current channel when the plurality of load units operate simultaneously. In this way, one load module 40 may include a plurality of load units, and the quantity of current channels can be reduced, to achieve an objective of saving costs.

The following describes a specific structure and an operation process of the power consumption detection circuit 30 in two possible implementations.

In a first possible implementation, any one of the plurality of current channels includes a sampling resistor. A first terminal of the sampling resistor is configured to connect to the energy storage module 150, and a second terminal of the sampling resistor is configured to connect to an input terminal of a load module 40 corresponding to the current channel.

In this embodiment, the processing module 310 includes a current sensing unit 314 and a processing unit 312. A detection terminal of the current sensing unit 314 is connected to the sampling resistor, and an output terminal of the current sensing unit 314 is connected to an input terminal of the processing unit 312. The current sensing unit 314 is configured to detect a voltage value of the sampling resistor, determine a current value of the current channel based on the voltage value of the sampling resistor, and send the current value of the current channel to the processing unit 312. The processing unit 312 is configured to determine power consumption of the corresponding load module 40 based on the current value of the current channel.

In some embodiments, the power consumption of the load module 40 may be at least one of a current value of the load module 40, a power of the load module 40, and electrical energy used by the load module 40 within preset duration.

When the power consumption of the load module 40 is the current value of the load module 40, as described above, the output terminal of each current channel is connected to the input terminal of the corresponding load module 40. That is, the current value of each current channel is a current value of the corresponding load module 40. Therefore, the current value of any current channel is the power consumption of the corresponding load module 40.

When the power consumption of the load module 40 is the power of the load module 40 or the electrical energy used by the load module 40 within the preset duration, the processing unit 312 is further configured to detect an input voltage value of the current channel, and determine the power consumption of the corresponding load module 40 based on the current value and the input voltage value of the current channel.

Specifically, when the power consumption of the load module 40 is the power of the load module 40, the processing unit 312 may include a multiplier. A first input terminal of the multiplier is configured to input the current value of the current channel, and a second input terminal of the multiplier is configured to input the input voltage value of the current channel. The multiplier is configured to multiply the current value of the current channel by the input voltage value to obtain the power of the corresponding load module 40, that is, obtain the power consumption of the corresponding load module 40.

When the power consumption of the load module 40 is the electrical energy used by the load module 40 within the preset duration, the processing unit 312 may include a multiplier and an integrator. A first input terminal of the multiplier is configured to input the current value of the current channel, a second input terminal of the multiplier is configured to input the input voltage value of the current channel, and an output terminal of the multiplier is connected to an input terminal of the integrator. The multiplier is configured to multiply the current value of the current channel by the input voltage value to obtain the power of the corresponding load module 40, and the integrator is configured to integrate the power of the load module 40 to obtain the electrical energy used by the load module 40 within the preset duration, that is, obtain the power consumption of the load module 40.

In a second possible implementation, any one of the plurality of current channels includes a first shunt unit 332. A first terminal of the first shunt unit 332 is configured to connect to the energy storage module 150, and a second terminal of the first shunt unit 332 is configured to connect to an input terminal of a load module 40 corresponding to the current channel.

In this embodiment, the processing module 310 includes a second shunt unit 317, a voltage regulation unit 319, a sampling resistor, a current sensing unit 314, and a processing unit 312. A first terminal of the second shunt unit 317 is connected to the first terminal of the first shunt unit 332. A first terminal of the voltage regulation unit 319 is connected to the second terminal of the first shunt unit 332, and a second terminal of the voltage regulation unit 319 is connected to a second terminal of the second shunt unit 317. Voltage values of the first terminal and the second terminal of the voltage regulation unit 319 are the same when the processing module 310 operates. A first terminal of the sampling resistor is connected to the second terminal of the second shunt unit 317, and a second terminal of the sampling resistor is configured to connect to a ground cable GND. A detection terminal of the current sensing unit 314 is connected to the sampling resistor, and an output terminal of the current sensing unit 314 is connected to an input terminal of the processing unit 312.

The current sensing unit 314 is configured to detect a voltage value of the sampling resistor, determine a current value of the sampling resistor based on the voltage value of the sampling resistor, determine a current value of the current channel based on the current value of the sampling resistor and a target ratio, and send the current value of the current channel to the processing unit 312. The processing unit 312 is configured to determine power consumption of the corresponding load module 40 based on the current value of the current channel.

The target ratio is a ratio of a current value of the first shunt unit 332 to a current value of the second shunt unit 317. When "determining a current value of the current channel based on the current value of the sampling resistor and a target ratio", the processing unit 312 may multiply the current value of the sampling resistor by the target ratio to obtain the current value of the current channel.

In some embodiments, any current channel further includes a switching component. The switching component is connected in series to another component in the current channel. To be specific, when any current channel includes a sampling resistor and a switching component, the sampling resistor and the switching component in the current channel are connected in series. When any current channel includes a first shunt unit 332 and a switching component, the first shunt unit 332 and the switching component in the current channel are connected in series.

A control terminal of the switching component is connected to an output terminal of the processing module 310. The processing module 310 is further configured to: control the switching component to be turned on if a first instruction is received; and control the switching component to be turned off if a second instruction is received. The first instruction is used to instruct the terminal device 10 to be powered on or instruct the load module 40 corresponding to the current channel to operate. The second instruction is used to instruct the terminal device 10 to be powered off or instruct the load module 40 corresponding to the current channel to stop operating.

In some embodiments, the power consumption detection circuit 30 further includes a power supply channel 320. An input terminal of the power supply channel 320 is configured to connect to the energy storage module 150, and an output terminal of the power supply channel 320 is connected to a power supply terminal of the processing module 310. That is, the energy storage module 150 separately supplies power to the processing module 310 in the power consumption detection circuit 30, and power consumption of the power consumption detection circuit 30 is not included in the power consumption of the load module 40 that is detected by the processing module 310. In this way, more realistic and accurate power consumption data of the load modules 40 during operation of the terminal device 10 can be obtained, thereby more precisely detecting the standby capability of the terminal device 10.

An embodiment of this application further provides a terminal device 10, including an energy storage module 150, a plurality of load modules 40, and the power consumption detection circuit 30 or the power consumption detection chip in any one of the foregoing embodiments. Each load module 40 includes a voltage conversion unit and a load unit that are connected in series. A plurality of voltage conversion units constitute a PMU. Any one of a plurality of load units may be one of a CPU, a GPU, a baseband processor, an internal memory, an external memory, a display, a camera, a loudspeaker, and a communication module.

The power consumption detection circuit 30 or the power consumption detection chip in the foregoing embodiments is applied to the terminal device 10, to detect power consumption of each load module 40. Based on this, power consumption generated when each application (application, APP) in the terminal device 10 operates may be detected, or power consumption of the terminal device 10 in any operation scenario (for example, a game scenario, a video playback scenario, an ebook reading scenario, or a lock-screen music listening scenario) may be detected.

The foregoing embodiments are merely used to describe the technical solutions of this application, but not limit the technical solutions of this application. Although this application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in embodiments of this application, and shall fall within the protection scope of this application.

The invention claimed is:

1. A terminal device, wherein the terminal device comprises an energy storage module, a power consumption detection circuit and a plurality of load modules;

the power consumption detection circuit comprises a processing module and a plurality of current channels;

a detection terminal of the processing module is connected to each of the plurality of current channels;

the plurality of current channels are in a one-to-one correspondence with the plurality of load modules;

input terminals of the plurality of current channels are configured to connect to the energy storage module, and an output terminal of each of the plurality of current channels is configured to connect to an input terminal of a corresponding load module;

and each of the plurality of load modules comprises a voltage conversion unit and a load unit that are connected in series.

2. The terminal device according to claim 1, wherein any one of the plurality of current channels comprises a sampling resistor, a first terminal of the sampling resistor is configured to connect to the energy storage module, and a second terminal of the sampling resistor is configured to connect to an input terminal of a load module corresponding to the current channel.

3. The terminal device according to claim 2, wherein the processing module comprises a current sensing unit and a processing unit; a detection terminal of the current sensing unit is connected to the sampling resistor, and an output terminal of the current sensing unit is connected to an input terminal of the processing unit; the current sensing unit is configured to detect a voltage value of the sampling resistor, determine a current value of the current channel based on the voltage value of the sampling resistor, and send the current value of the current channel to the processing unit; and the processing unit is configured to determine power consumption of the corresponding load module based on the current value of the current channel.

4. The terminal device according to claim 3, wherein the processing unit is further configured to detect an input voltage value of the current channel, and determine the power consumption of the corresponding load module based on the current value and the input voltage value of the current channel; and the power consumption of the load module comprises at least one of a power of the load module and electrical energy used by the load module within preset duration.

5. The terminal device according to claim 4, wherein the processing unit comprises a multiplier, a first input terminal of the multiplier is configured to input the current value of the current channel, a second input terminal of the multiplier is configured to input the input voltage value of the current channel, and the multiplier is configured to multiply the current value of the current channel by the input voltage value to obtain the power of the corresponding load module.

6. The terminal device according to claim 4, wherein the processing unit comprises a multiplier and an integrator;

a first input terminal of the multiplier is configured to input the current value of the current channel, a second input terminal of the multiplier is configured to input the input voltage value of the current channel, and an output terminal of the multiplier is connected to an input terminal of the integrator; and the multiplier is configured to multiply the current value of the current channel by the input voltage value to obtain the power of the corresponding load module, and the integrator is configured to integrate the power of the load module to obtain the electrical energy used by the load module within the preset duration.

7. The terminal device according to claim 1, wherein any one of the plurality of current channels comprises a first shunt unit, a first terminal of the first shunt unit is configured to connect to the energy storage module, and a second terminal of the first shunt unit is configured to connect to an input terminal of a load module corresponding to the current channel.

8. The terminal device according to claim 7, wherein the processing module comprises a second shunt unit, a voltage regulation unit, a sampling resistor, a current sensing unit, and a processing unit;

a first terminal of the second shunt unit is connected to the first terminal of the first shunt unit, a first terminal of the voltage regulation unit is connected to the second terminal of the first shunt unit, a second terminal of the voltage regulation unit is connected to a second terminal of the second shunt unit, voltage values of the first terminal and the second terminal of the voltage regulation unit are the same when the processing module operates, a first terminal of the sampling resistor is connected to the second terminal of the second shunt unit, and a second terminal of the sampling resistor is configured to connect to a ground cable;

a detection terminal of the current sensing unit is connected to the sampling resistor, and an output terminal of the current sensing unit is connected to an input terminal of the processing unit;

the current sensing unit is configured to detect a voltage value of the sampling resistor, determine a current value of the sampling resistor based on the voltage value of the sampling resistor, determine a current value of the current channel based on the current value of the sampling resistor and a target ratio, and send the current value of the current channel to the processing unit, wherein the target ratio is a ratio of a current value of the first shunt unit to a current value of the second shunt unit; and the processing unit is configured to determine power consumption of the corresponding load module based on the current value of the current channel.

9. The terminal device according to claim 8, wherein the processing unit is configured to multiply the current value of the sampling resistor by the target ratio to obtain the current value of the current channel.

10. The terminal device according to claim 2, wherein the current channel further comprises a switching component, and the switching component is connected in series to another component in the current channel; and a control terminal of the switching component is connected to an output terminal of the processing module, and the processing module is further configured to control the switching component to be turned on if a first instruction is received, wherein the first instruction is used to instruct the terminal device to be powered on or instruct the load module corresponding to the current channel to operate.

11. The terminal device according to claim 10, wherein the processing module is further configured to control the switching component to be turned off if a second instruction is received, wherein the second instruction is used to instruct the terminal device to be powered off or instruct the load module corresponding to the current channel to stop operating.

12. The terminal device according to claim 1, wherein the processing module is configured to detect a current value of each current channel if a third instruction is received, and determine the power consumption of the corresponding load module based on the current value of each current channel, wherein the third instruction is used to instruct the processing module to start detecting the power consumption of the load module corresponding to each current channel.

13. The terminal device according to claim 1, wherein the processing module is further configured to stop detecting a current value of each current channel if a fourth instruction is received, wherein the fourth instruction is used to instruct the processing module to stop detecting the power consumption of the load module corresponding to each current channel.

14. The terminal device according to claim 1, wherein the load module corresponding to any one of the plurality of current channels comprises one voltage conversion unit and a plurality of load units, an output terminal of the current channel is configured to connect to an input terminal of the voltage conversion unit, and an output terminal of the voltage conversion unit is connected to the plurality of load units; and the processing module is further configured to: when the plurality of load units operate simultaneously, determine power consumption of one of the plurality of load units based on a current value of the current channel and a preset ratio, wherein the preset ratio is a ratio of the power consumption of the load unit to the power consumption of the load module corresponding to the current channel when the plurality of load units operate simultaneously.

15. The terminal device according to claim 1, wherein the power consumption detection circuit further comprises a power supply channel, an input terminal of the power supply channel is configured to connect to the energy storage module, and an output terminal of the power supply channel is connected to a power supply terminal of the processing module.

16. The terminal device according to claim 1, wherein a load unit of any one of the plurality of load modules comprises one of a central processing unit, a graphics processing unit, a baseband processor, a loudspeaker, and a display.

17. The terminal device according to claim 1, wherein voltage conversion units in the plurality of load modules constitute a power management module.

* * * * *